US008812969B2

(12) United States Patent
Hart et al.

(10) Patent No.: US 8,812,969 B2
(45) Date of Patent: Aug. 19, 2014

(54) METHODS FOR AUTHORING AND INTERACTING WITH MULTIMEDIA REPRESENTATIONS OF DOCUMENTS

(75) Inventors: Peter E. Hart, Menlo Park, CA (US); Berna Erol, San Jose, CA (US); Kathrin Berkner, Los Altos, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 627 days.

(21) Appl. No.: 11/689,394

(22) Filed: Mar. 21, 2007

(65) Prior Publication Data
US 2008/0235585 A1 Sep. 25, 2008

(51) Int. Cl.
*G06F 3/048* (2013.01)
(52) U.S. Cl.
USPC ............ 715/765; 715/730; 715/731; 715/732
(58) Field of Classification Search
CPC . G06F 3/0483; G06F 3/04855; G06F 17/211; G06F 17/30873; G06F 17/30011; G06F 17/243; G06F 17/212; G06F 17/241; G06K 9/00442
USPC .................................. 715/730, 731, 732, 765
See application file for complete search history.

(56) References Cited

U.S. PATENT DOCUMENTS

| 5,335,290 A | 8/1994 | Cullen et al. |
| 5,434,953 A | 7/1995 | Bloomberg |
| 5,495,567 A | 2/1996 | Iizawa et al. |
| 5,619,594 A | 4/1997 | Melen |
| 5,625,767 A | 4/1997 | Bartell et al. |
| 5,761,485 A | 6/1998 | Munyan |
| 5,781,773 A | 7/1998 | Vanderpool et al. |
| 5,781,879 A | 7/1998 | Arnold et al. |
| 5,832,530 A | 11/1998 | Paknad et al. |
| 5,873,077 A | 2/1999 | Kanoh et al. |
| 5,892,507 A * | 4/1999 | Moorby et al. ............... 715/205 |
| 5,897,644 A | 4/1999 | Nielsen |
| 5,903,904 A | 5/1999 | Peairs |
| 5,910,805 A | 6/1999 | Hickey et al. |
| 5,960,126 A | 9/1999 | Nielsen et al. |
| 5,963,966 A | 10/1999 | Mitchell et al. |
| 6,018,710 A | 1/2000 | Wynblatt et al. |

(Continued)

FOREIGN PATENT DOCUMENTS

| EP | 1 560 127 A2 | 8/2005 |
| JP | 10-105694 | 4/1998 |

(Continued)

OTHER PUBLICATIONS

European Search Report dated Aug. 6, 2009; EP Patent Application No. 08 152 937.2-1527 (4 pages).

(Continued)

*Primary Examiner* — Amy Ng
*Assistant Examiner* — Andres E Gutierrez
(74) *Attorney, Agent, or Firm* — Blakely, Sokoloff, Taylor & Zafman, LLP

(57) ABSTRACT

A method, apparatus and article of manufacture for assisting a user with authoring a multimedia representation of documents. In one embodiment, the method comprises displaying one or more visual, audible, or audiovisual document elements from an input document in graphical user interface; and selecting one or more elements and for inclusion in a multimedia representation.

37 Claims, 13 Drawing Sheets

(56) References Cited

U.S. PATENT DOCUMENTS

| | | | |
|---|---|---|---|
| 6,043,802 A | 3/2000 | Gormish | |
| 6,044,348 A | 3/2000 | Imade et al. | |
| 6,141,452 A | 10/2000 | Murao | |
| 6,144,974 A | 11/2000 | Gartland | |
| 6,173,286 B1 | 1/2001 | Guttman et al. | |
| 6,178,272 B1 | 1/2001 | Segman | |
| 6,236,987 B1 | 5/2001 | Horowitz et al. | |
| 6,249,808 B1 | 6/2001 | Seshadri | |
| 6,301,586 B1 | 10/2001 | Yang et al. | |
| 6,317,164 B1 | 11/2001 | Hrusecky et al. | |
| 6,349,132 B1 | 2/2002 | Wesemann et al. | |
| 6,377,704 B1 | 4/2002 | Cooperman | |
| 6,598,054 B2 | 7/2003 | Schuetze et al. | |
| 6,665,841 B1 | 12/2003 | Mahoney et al. | |
| 6,704,024 B2 | 3/2004 | Robotham et al. | |
| 6,747,648 B2 | 6/2004 | Hoehn et al. | |
| 6,778,970 B2 | 8/2004 | Au | |
| 6,788,347 B1 | 9/2004 | Kim et al. | |
| 6,804,418 B1 | 10/2004 | Yu et al. | |
| 6,856,415 B1 | 2/2005 | Simchik et al. | |
| 6,862,713 B1 | 3/2005 | Kraft et al. | |
| 6,873,343 B2 | 3/2005 | Chui | |
| 6,924,904 B2 | 8/2005 | Stevens et al. | |
| 6,928,087 B2 | 8/2005 | Slowe et al. | |
| 6,931,151 B2 | 8/2005 | Weast | |
| 6,938,202 B1 | 8/2005 | Matsubayashi et al. | |
| 6,940,491 B2 | 9/2005 | Incertis Carro | |
| 6,970,602 B1 * | 11/2005 | Smith et al. | 382/232 |
| 7,010,746 B2 | 3/2006 | Purvis | |
| 7,020,839 B1 | 3/2006 | Hosoda | |
| 7,035,438 B2 | 4/2006 | Harrington et al. | |
| 7,051,275 B2 | 5/2006 | Gupta et al. | |
| 7,069,506 B2 | 6/2006 | Rosenholtz et al. | |
| 7,095,907 B1 | 8/2006 | Berkner et al. | |
| 7,107,525 B2 | 9/2006 | Purvis | |
| 7,151,547 B2 | 12/2006 | Lin et al. | |
| 7,171,617 B2 | 1/2007 | Harrington et al. | |
| 7,171,618 B2 | 1/2007 | Harrington et al. | |
| 7,177,488 B2 | 2/2007 | Berkner et al. | |
| 7,203,902 B2 | 4/2007 | Balinsky | |
| 7,263,659 B2 | 8/2007 | Hull et al. | |
| 7,272,258 B2 | 9/2007 | Berkner et al. | |
| 7,272,791 B2 | 9/2007 | Sahuc et al. | |
| 7,330,608 B2 | 2/2008 | Berkner et al. | |
| 7,345,688 B2 | 3/2008 | Baudisch et al. | |
| 7,383,505 B2 | 6/2008 | Shimzu et al. | |
| 7,428,338 B2 | 9/2008 | Berkner et al. | |
| 7,434,159 B1 | 10/2008 | Lin | |
| 7,487,445 B2 | 2/2009 | Purvis et al. | |
| 7,505,178 B2 | 3/2009 | Erol et al. | |
| 7,573,604 B2 | 8/2009 | Hull et al. | |
| 7,576,756 B1 | 8/2009 | Good et al. | |
| 7,603,620 B2 | 10/2009 | Erol et al. | |
| 7,624,169 B2 | 11/2009 | Lisiecki et al. | |
| 7,640,164 B2 | 12/2009 | Sasaki et al. | |
| 7,752,187 B2 * | 7/2010 | Horikiri et al. | 707/705 |
| 7,861,169 B2 | 12/2010 | Hull et al. | |
| 7,886,226 B1 | 2/2011 | McCoy et al. | |
| 8,073,263 B2 | 12/2011 | Hull et al. | |
| 8,156,116 B2 | 4/2012 | Graham et al. | |
| 8,201,076 B2 | 6/2012 | Hull et al. | |
| 8,271,489 B2 | 9/2012 | Lin et al. | |
| 2001/0056434 A1 | 12/2001 | Kaplan et al. | |
| 2002/0029232 A1 | 3/2002 | Bobrow et al. | |
| 2002/0055854 A1 | 5/2002 | Kurauchi et al. | |
| 2002/0073119 A1 | 6/2002 | Richard | |
| 2002/0184111 A1 | 12/2002 | Swanson | |
| 2002/0194324 A1 | 12/2002 | Guha | |
| 2003/0014445 A1 | 1/2003 | Formanek et al. | |
| 2003/0182402 A1 | 9/2003 | Goodman et al. | |
| 2003/0196175 A1 | 10/2003 | Shea | |
| 2004/0019851 A1 | 1/2004 | Purvis et al. | |
| 2004/0025109 A1 | 2/2004 | Harrington et al. | |
| 2004/0070631 A1 * | 4/2004 | Brown et al. | 345/838 |
| 2004/0093565 A1 | 5/2004 | Bernstein et al. | |
| 2004/0120589 A1 | 6/2004 | Lopresti et al. | |
| 2004/0145593 A1 | 7/2004 | Berkner et al. | |
| 2004/0181747 A1 | 9/2004 | Hull et al. | |
| 2004/0201609 A1 | 10/2004 | Obrador | |
| 2004/0230570 A1 | 11/2004 | Hatta et al. | |
| 2005/0028074 A1 | 2/2005 | Harrington et al. | |
| 2005/0068581 A1 | 3/2005 | Hull et al. | |
| 2005/0071763 A1 | 3/2005 | Hart et al. | |
| 2005/0076290 A1 | 4/2005 | Balinsky | |
| 2005/0084136 A1 | 4/2005 | Xie et al. | |
| 2005/0223326 A1 | 10/2005 | Chang et al. | |
| 2005/0229107 A1 | 10/2005 | Hull et al. | |
| 2005/0246375 A1 | 11/2005 | Manders et al. | |
| 2005/0289127 A1 | 12/2005 | Giampaolo et al. | |
| 2006/0022048 A1 | 2/2006 | Johnson | |
| 2006/0122884 A1 | 6/2006 | Graham et al. | |
| 2006/0136478 A1 | 6/2006 | Berkner | |
| 2006/0136491 A1 | 6/2006 | Berkner et al. | |
| 2006/0136803 A1 * | 6/2006 | Erol et al. | 715/500 |
| 2006/0161562 A1 | 7/2006 | McFarland et al. | |
| 2006/0256388 A1 | 11/2006 | Erol et al. | |
| 2007/0047002 A1 | 3/2007 | Hull et al. | |
| 2007/0061384 A1 | 3/2007 | Harrington et al. | |
| 2007/0091366 A1 | 4/2007 | McIntyre | |
| 2007/0118399 A1 | 5/2007 | Avinash et al. | |
| 2007/0168852 A1 | 7/2007 | Erol et al. | |
| 2007/0168856 A1 | 7/2007 | Berkner et al. | |
| 2007/0198951 A1 | 8/2007 | Frank | |
| 2007/0201752 A1 | 8/2007 | Gormish et al. | |
| 2007/0203901 A1 | 8/2007 | Prado et al. | |
| 2007/0208996 A1 | 9/2007 | Berkner et al. | |
| 2008/0005690 A1 * | 1/2008 | Van Vugt | 715/765 |
| 2008/0168154 A1 | 7/2008 | Skyrm et al. | |
| 2008/0235207 A1 | 9/2008 | Berkner et al. | |
| 2008/0235276 A1 | 9/2008 | Erol et al. | |
| 2008/0235564 A1 | 9/2008 | Erol et al. | |
| 2008/0235585 A1 | 9/2008 | Hart et al. | |
| 2009/0100048 A1 | 4/2009 | Hull et al. | |
| 2009/0125510 A1 | 5/2009 | Graham et al. | |

FOREIGN PATENT DOCUMENTS

| | | |
|---|---|---|
| JP | 10-116065 | 5/1998 |
| JP | 10-162003 | 6/1998 |
| JP | 2000-231475 | 8/2000 |
| JP | 2000-306103 | 11/2000 |
| JP | 2001-056811 | 2/2001 |
| JP | 2001-101164 | 4/2001 |
| JP | 2002-351861 | 12/2002 |
| JP | 2005-110280 | 4/2005 |
| WO | WO 2007/023991 A1 | 3/2007 |

OTHER PUBLICATIONS

European Search Report dated Sep. 7, 2008, EP Patent Application No. 08 152 937.2-1527 (7 pages).

Erol, B., et al., "Multimedia Thumnails for Documents," Proceedings of the MM'06 [Online] URL: http://www.standford.edu/{sidj/papers/mmthumbs_acm.pdf>, Oct. 23, 2006, pp. 231-240.

Erol, B., et al., "Multimedia Thumbnails: A New Way to Browse Documents on Small Display Device," Ricoh Technical Report, No. 31, Dec. 2005.

Zhao, et al., "Narrowing the Semantic Gap-Improved Text-Based Web Document Retrieval Using Visual features," IEEE, pp. 189-200.

Rollins, Sami, et al, "Wireless and Mobile Networks Performance: Power-Aware Data Management for Small Devices", Proceedings of the 5th ACM International Workshop on Wireless Mobile Multimedia WOWMOM '02, Sep. 2002, pp. 80-87.

Hexel, Rene, et al, "PowerPoint to the People: Suiting the Word to the Audience", Proceedings of the Fifth Conference on Australasian User Interface—vol. 28 AUIC '04, Jan. 2004, pp. 49-56.

Muer, O. Le, et al, "Performance Assessment of a Visual Attention System Entirely Based on a Human Vision Modeling," Proceedings of ICIP 2004, Singapore, 2004, pp. 2327-2330.

Matsuo, Y., et al, "Keyword Extraction from a Single Document using Word Co-occurrence Statistical Information," International Journal on Artificial Intelligence Tools, vol. 13, No. 1, Jul. 13, 2003, pp. 157-169.

(56) References Cited

OTHER PUBLICATIONS

Fukumoto, Fumiyo, et al, "An Automatic Extraction of Key Paragraphs Based on Context Dependency," Proceedings of Fifth Conference on Applied Natural Language Processing, 1997, pp. 291-298.
Aiello, Marco, et al, "Document Understanding for a Broad Class of Documents," vol. 5(1), International Journal on Document Analysis and Recognition (IJDAR) (2002) 5, pp. 1-16.
"About Netpbm," home page for Netpbm downloaded on Jan. 29, 2010, http://netpbm.sourceforge.net/, pp. 1-5.
"Optimization Technology Center of Northwestern University and Argonne National Laboratory," http://www.optimization.eecs.northwestern.edu/, 1 page, downloaded Jan. 29, 2010.
Dowsland, Kathryn A., et al., "Packing Problems," European Journal of Operational Research, 56 (1002) 2-14, North-Holland, 13 pages.
Iyengar, Vikram, et al., "On Using Rectangle Packing for SOC Wrapper/TAM Co-Optimization," www.ee.duke.edu/~krish/Vikram.uts02.pdf, 6 pages.
Meller, Russell D., et al., "The Facility Layout Problem: Recent and Emerging Trends and Perspectives," Journal of Manufacturing Systems, vol. 15/No. 5 1996, pp. 351-366.
Hahn, Peter, M., "Progress in Solving the Nugent Instances of the Quadratic Assignment Problem," 6 pages.
Gould, Nicholas I.M., et al., "A Quadratic Programming Bibliography," http://www.optimization-online.org/DB_FILE/2001/02/285.pdf, 139 pages.
Anjos, Miguel F., et al., "A New Mathematical Programming Framework for Facility Layout Design," University of Waterloo Technical Report UW-W&CE#2002-4, www.optimization_online.org./DB_HTML/2002/454.html, 18 pages.
Maderlechner, et al., "Information Extraction from Dcoument Images using Attention Based Layout Sementation," Proceedings of DLIA, 1999, pp. 216-219.
Wang, et al., "MobiPicture—Browsing Pictures on Mobile Devies," 2003 Multimedia Conference, Proceedings of the 11th ACM International Conference on Multimedia, ACM MM'03, ACM 1-58113-722-2/03/0011, Berkeley, California, Nov. 2-8, 2003, 5 pages.
Fan, et al. "Visual Attention Based Image Browsing on Mobile Devices," International Conference on Multimedia and Exp., vol. 1, Baltimore, MD., IEEE, 0-7803-7965-9/03 Jul. 2003, pp. 53-56.
"Human Resources Toolbox, Human Resources Toolbox, Building an Inclusive Development Community: Gender Appropriate Technical Assistance to InterAction Member Agencies on Inclusion of People with Diabilities," Mobility International USA, 2002 Mobility International USA, http://www.miusa.org/idd/keyresources/hrtoolbox/humanresourcestlbx/?searchterm=Human Resources Toolbox, downloaded Feb. 3, 2010, 1 page.
Cormen, Thomas H., Leiserson, Charles, E., and Rivest, Ronald L., Introduction to Algorithms, MIT Press, MC-Graw-Hill, Cambridge Massachusetts, 1997, 6 pages.
Roth, et al., "Auditory Browser for Blind and Visually Impaired Users," CHI'99, Pittsburgh, Pennsylvania, May 15-20, 1999, ACM ISBN 1-58113-158-5, pp. 218-219.
Lam, H., et al., "Summary Thumbnails: Readable Overviews for Small Screen Web Browsers," CHI 2005, Conference Proceedings. Conference on Human Factors in Computing Systems, Portland, Oregon, Apr. 2-7, 2005, CHI Conference Proceedings, Human Factors in Computing Systems, New York, NY: ACM, US, Apr. 2, 2005, XP002378456, ISBN: 1-58113-998-5, pp. 1-10.
European Patent Office Search Report for European Patent Application EP 07 25 0134, Jun. 21, 2007, 9 pages.
Erol, Berna, et al., An Optimization Framework for Multimedia Thumbnails for Given Time, Display, and Application Constraints, Aug. 2005, 1-17 pages.
El-Kwae, E., et al., "A Robust Framework for Content-Based Retrieval by Spatial Similarity in Image Databases," Transactions on Information Systems (TOIS), vol. 17, Issue 2, Apr. 1999, pp. 174-198.
Dahl, Joachin and Vandenbeube, Lieven, "CVXOPT: A Python Package for Convex Optimization," http://abel.ee.ucla.edu/cvxopt/ downloaded Feb. 5, 2010, 2 pages.
Grant, Michael, et al., "CVX, Matlab Software for Disciplined Convex Programming," http://www.stanford.edu/~boyd/cvx/, downloaded Feb. 5, 2010, 2 pages.
Haralick, Robert M., "Document Image Understanding: Geometric and Logical Layout," IEEE Computer Vision and Pattern Recognition 1994 (CVPR94), 1063-6919/94, pp. 385-390.
Hsu, H.T., An Algorithm for Finding a Minimal Equivalent Graph of a Digraph, Journal of the ACM (JACM), V. 22 N. 1, Jan. 1975, pp. 11-16.
Nagy, Georgy, et. al., "Hierarchical Representation of Optically Scanned Documents," Proc. Seventh Int'l Conf. Pattern Recognition, Montreal, 1984 pp. 347-349.
Dengel, A., "ANASTASIL: A System for Low-Level and High-Level Geometric Analysis of Printed Documents" in Henry S. Baird, Horst Bunke, and Kazuhiko Yamamoto, editors, Structured Document Image Analysis, Springer-Verlag, 1992, pp. 70-98.
Duda, et al., "Pattern Classification, " Second Edition, Chapter 1—Introduction, Copyright @ 2001 by John Wiley & Sons, Inc., New York, ISBN0-471-05669-3 (alk. paper), 22 pages.
Gao, et al., "An Adaptive Algorithm for Text Detection from Natural Scenes," Proceedings of the 2001 IEEE Computer Society Conferences on Computer Vision and Pattern Recognition, Kauai, HI, USA, Dec. 8-14, 6 pages.
Polyak, et al., "Mathematical Programming: Nonlinear Rescaling and Proximal-like Methods in Convex Optimization," vol. 76, 1997, pp. 265-284.
Baldick, et al., "Efficient Optimization by Modifying the Objective Function: Applications to Timing-Driven VLSI Layout," IEEE Transactions on Circuits and Systems, vol. 48, No. 8, Aug. 2001, pp. 947-956.
Kandemir, et al. "A Linear Algebra Framework for Automatic Determination of Optimal Data Layouts," IEEE Transactions on Parallel and Distributed System, vol. 10, No. 2, Feb. 1999, pp. 115-135.
Lin, Xiaofan, "Active Document Layout Synthesis," IEEE Proceedings of the Eight International Conference on Document Analysis and Recognition, Aug. 29, 2005-Sep. 1, 2005, XP010878059, Seoul, Korea, pp. 86-90.
Boyd, Stephen, et al. "Review of Convex Optimization," Internet Article, http://www.cambridge.org/us/catalogue/catalogue.asp?isbn=0521833787, Cambridge University Press, XP-002531694, Apr. 8, 2004, pp. 1-2.
European Patent Office Search Report for European Patent Application EP 07 25 0928, Jul. 8, 2009, 7 pages.
Fukuhara, R., "International Standard for Motion Pictures in addition to Still Pictures: Summary and Application of JPEG2000/Motion-JPEG2000 Second Part", Interface, Dec. 1, 2002, 13 pages, vol. 28-12, CQ Publishing Company, *no translation provided*, 17 pages.
Japanese Office Action for Japanese Patent Application No. 2004-018221, dated Jun. 9, 2009, 6 pages.
Harrington, Steven J., et al., "Aesthetic Measures for Automated Document Layout," Proceedings of Document Engineering '04, Milwaukee, Wisconsin, ACM 1-58113-938-1/04/0010, Oct. 28-30, 2004, 3 pages.
Opera Software, "Opera's Small-Screen Rendering™," http://web.archive.org/web/20040207115650/http://www.opera.com/products/smartphone/smallscreen/ downloaded Feb. 25, 2010, pp. 1-4.
"AT&T Natural Voices" website, http://web.archive.org/web/20060318161559/http://www.nextup.com/attnv.html, downloaded Feb. 25, 2010, pp. 1-3.
Berkner, Kathrin, et al., "SmartNails—Display and Image Dependent Thumbnails," Proceedings of SPIE-IS&T Electronic Imaging, SPIE vol. 5296 © 2004, SPIE and IS&T—0277-786X/04, Downloaded form SPIE Digital Library on Jan. 29, 2010 to 151.207.244.4, pp. 54-65.
European Patent Office Search Report for European Patent Application EP 08153000.8-1527, Oct. 7, 2008, 7 pages.
World Wide Web Consortium, Document Object Model Level 1 Specification, ISBN-10; 1583482547, Iuniverse Inc, 2000., 212 pages.
Erol, B., et al., "Computing a Multimedia Representation for Documents Given Time and Display Constraints," Proceedings of ICME 2006, Toronto, Canada, 2006, pp. 2133-2136.

(56) References Cited

OTHER PUBLICATIONS

Erol, B., et al., "Prescient Paper: Multimedia Document Creation with Document Image Matching," IEEE Proceedings of the 17th International Conference on Pattern Recognition, 2004, ICPR 2004, vol. 2, Downloaded on May 6, 2010, pp. 675-678.
Marshall, C.C, et al., "Reading-in-the-Small: A Study of Reading on Small Form Factor Devices," Proceedings of the JCDL 2002, Jul. 13-17, 2002, Portland, Oregon, ACM 1-58113-513-0/02/0007, pp. 56-64.
Breuel, T., et al., "Paper to PDA," Proceedings of the 16th International Conference on Pattern Recognition, vol. 1, Publication Date: 2002, pp. 476-479.
Chen, F., et al., "Extraction of Indicative Summary Sentences from Imaged Documents," Proceedings of the Fourth International Conference on Document Analysis and Recognition, 1997, vol. 1, Publication Date: Aug. 18-20, 1997, pp. 227-232.
Alam, H., et al., "Web Page Summarization for Handheld Devices: A Natural Language Approach," Proceedings of the 7th International Conference on Document Analysis and Recognition, 2003, pp. 1153-1157.
Eglin, V., et al., "Document Page Similarity Based on Layout Visual Saliency: Application to Query by Example and Document Classification," Proceedings of the 7th International Conference on Document Analysis and Recognition, 2003, Publication Date: Aug. 3-6, 2003, pp. 1208-1212.
Xie, Xing, et al., "Learning User Interest for Image Browsing on Small-Form-Factor Devices," Proceedings of ACM Conference Human Factors in Computing Systems, 2005, pp. 671-680.
Neelamani, Ramesh, et al., "Adaptive Representation of JPEG 2000 Images Using Header-Based Processing," Proceedings of IEEE International Conference on Image Processing 2002, pp. 381-384.
Xie, Xing, et al., "Browsing Large Pictures Under Limited Display Sizes," IEEE Transactions on Multimedia, vol. 8 Issue: 4, Digital Object Identifier: 10.1109/TMM.2006.876294, Date: Aug. 2006, pp. 707-715.
Liu, F, et al., "Automating Pan and Scan," Proceedings of International Conference of ACM Multimedia, Oct. 23-278, 2006,Santa Barbara, CA, ACM 1-59593-447-2/06/0010, 10 pages.
Woodruff, Allison, et al., "Using Thumbnails to Search the Web," Proceedings from SIGCHI 200, Mar. 31-Apr. 4, 2001, Seattle, WA, ACM 1-58113-327-8/01/0003, pp. 198-205.
Secker, A., et al., "Highly Scalable Video Compression with Scalable Motion Coding," IEEE Transactions on Image Processing, vol. 13, Issue 8, Date: Aug. 2004, Digital Object Identifier: 10.1109/TIP. 2004.826089, pp. 1029-1041.
"ISO/IEC JTC 1/SC 29/WG 1 N1646R, (ITU-T SG8) Coding of Still Pictures, JBIG (Joint Bi-Level Image Experts Group)," JPEG—(Joint Photographic Experts Group), Mar. 16, 2000, Title: JPEG 2000 Part I Final Committee Draft Version 1.0, Source: ISO/IEC JTC1/SC29 WG1, JPEG 2000, Editor Martin Boliek, Co-Editors: Charilaos Christopoulous, and Eric Majani, Project: 1.29.15444 (JPEG 2000), 204 pages.
"Information Technology—Coding of Audio-Visual Objects—Part 2: Visual," ITU-T International Standard ISO/IEC 14496-2 Second Edition, Dec. 1, 2001 (MPEG4-AVC), Reference No. ISO/IEC 14496-2:2001(E), 536 pages.
Adobe, "PDF Access for Visually Impaired," http://web.archive.org/web/20040516080951/http://www.adobe.com/support/salesdocs/10446.htm, downloaded May 17, 2010, 2 pages.
Salton, Gerard, "Automatic Indexing," *Automatic Text Processing, The Transformation, Analysis, and Retrieval of Information by Computer*, Chapter 9, Addison Wesley Publishing Company, ISBN: 0-201-12227-8, 1989, 38 pages.
"FestVOX," http://festvox.org/voicedemos.html, downloaded May 6, 2010, 1 page.
Ogden, William, et al., "Document Thumbnail Visualizations for Rapid Relevance Judgments: When do they pay off?" TREC 1998, pp. 528-534, (1995) (7 pgs.).
Peairs, Mark, "Iconic Paper", Proceedings of 3rd ICDAR, '95, vol. 2, pp. 1174-1179 (1995) (3 pgs.).
Graham, Jamey, "The Reader's Helper: a personalized document reading environment," Proc. SIGCHI '99, May 15-20, 1999, pp. 481-488, (9 pgs.).
JPEG 2000 Part 6 FCD15444-6, Information Technology JPEG 2000 "Image Coding Standard—Part 6: Compound Image File Format" ISO/IEC, JTC1/SC 29/WG1 N2401, FCD 15444-6, Nov. 16, 2001 (81 pgs.).
JBIG—Information Technology-Coded Representation of Picture and Audio Information—Lossy/Lossless Coding of Bi-level Images, ISO/IEC, JTC1/SC 29/WG1 N1359, 14492 FCD, Jul. 16, 1999, (189 pgs.).
Woodruff, Allison, et al., "Using Thumbnails to Search the Web" Proc. SIGCHI 01, Mar. 31-Apr. 4, 2001, Seattle, Washington, USA—(8 pgs.).
Peairs, Mark, "Iconic Paper", Proceedings of $3^{rd}$ ICDAR, '95, vol. 2, pp. 1174-1179 (1995) (6 pgs.).
Breuel, Thomas M., et al., "Paper to PDA," IEEE 2002, pp. 476-479 (2002) (4 pgs.).
Japanese Application No. 2007-056061, Office Action, Date Stamped Sep. 3, 2011, 2 pages [Japanese Translation].
Erol, Berna, et al, "MPEG-4, H.264/AVC, and MPEG-7: New Standards for the Digital Video Industry," Image and Video Processing, Second Ed, Elsevier Academic Press, 2005, pp. 489-875.
ITU-T H.264, "Advanced video coding for generic audiovisual services," May 2003, 271 pages.
ITU-T H.264.1, "Conformance specification for H.264 advanced video coding," International Telecommunication Union, Mar. 2005, 52 pages.

\* cited by examiner

METHODS FOR AUTHORING AND INTERACTING WITH MULTIMEDIA REPRESENTATIONS OF DOCUMENTS

RELATED APPLICATIONS

This application is related to the U.S. patent application Ser. No. 11/018,231, U.S. Pat. No. 7,603,620 entitled "Creating Visualizations of Documents," filed on Dec. 20, 2004; U.S. patent application Ser. No. 11/332,533, U.S. Pat. No. 7,761,789 entitled "Methods for Computing a Navigation Path," filed on Jan. 13, 2006; U.S. patent application Ser. No. 11/689,382, entitled "Methods for Converting Electronic Content Descriptions," filed on Mar. 21, 2007; and U.S. patent application Ser. No. 11/689,401, entitled, "Methods for Scanning, Printing, and Copying Multimedia Thumbnails," filed on Mar. 21, 2007, assigned to the corporate assignee of the present invention.

FIELD OF THE INVENTION

The present invention is related to processing and presenting documents; more particularly, the present invention is related to a graphical user interface that receives user input in the composition and playback of a multimedia representation of documents.

BACKGROUND OF THE INVENTION

With the increased ubiquity of wireless networks, mobile work, and personal mobile devices, more people browse and view web pages, photos, and even documents using small displays and limited input peripherals. One current solution for web page viewing using small displays is to design simpler, low-graphic versions of web pages. Photo browsing problems are also partially solved by simply showing a low resolution version of photos and giving the user the ability to zoom in and scroll particular areas of each photo.

Browsing and viewing documents, on the other hand, is a much more challenging problem. Documents may be multi-page, have a much higher resolution than photos (requiring much more zooming and scrolling at the user's side in order to observe the content), and have highly distributed information (e.g., focus points on a photo may be only a few people's faces or an object in focus where a typical document may contain many focus points such as title, authors, abstract, figures, references). The problem with viewing and browsing documents is partially solved for desktop and laptop displays by the use of document viewers and browsers, such as Acrobat and MSWord. These allow zooming in a document, switching between document pages, and scrolling thumbnail representations. Such highly interactive processes can be acceptable for desktop applications, but considering that mobile devices (e.g., phones and PDAs) have limited input peripherals, with limited input and even smaller displays, a better solution for document browsing and viewing is needed for document browsing on these devices.

Ricoh Innovations of Menlo Park, Calif. developed a technology referred to herein as SmartNail Technology. SmartNail Technology creates an alternative image representation adapted to given display size constraints. SmartNail processing may include three steps: (1) an image analysis step to locate image segments and attach a resolution and importance attribute to them, (2) a layout determination step to select visual content in the output thumbnail, and (3) a composition step to create the final SmartNail image via cropping, scaling, and pasting of selected image segments. The input, as well as the output of SmartNail processing, is a still image. All information processed during the three steps results in static visual information. For more information, see U.S. patent application Ser. No. 10/354,811, entitled "Reformatting Documents Using Document Analysis Information," filed Jan. 29, 2003, published Jul. 29, 2004 (Publication No. US 2004/0146199 A1); U.S. patent application Ser. No. 10/435,300, entitled "Resolution Sensitive Layout of Document Regions," filed May 9, 2003, published Jul. 29, 2004 (Publication No. US 2004/0145593 A1); and U.S. patent application Ser. No. 11/023,142, entitled "Semantic Document Smartnails," filed on Dec. 22, 2004, published Jun. 22, 2006 (Publication No. US 2006-0136491 A1).

Web page summarization, in general, is well-known in the prior art to provide a summary of a webpage. However, the techniques to perform web page summarization are heavily focused on text and usually does not introduce new channels (e.g., audio) that are not used in the original web page. Exceptions include where audio is used in browsing for blind people as is described below and in U.S. Pat. No. 6,249,808.

Maderlechner et al. discloses first surveying users for important document features, such as white space, letter height, etc and then developing an attention based document model where they automatically segment high attention regions of documents. They then highlight these regions (e.g., making these regions print darker and the other regions more transparent) to help the user browse documents more effectively. For more information, see Maderlechner et al., "information Extraction from Document Images using Attention Based Layout Segmentation," Proceedings of DLIA, pp. 216-219, 1999.

At least one technique in the prior art is for non-interactive picture browsing on mobile devices. This technique finds salient, face and text regions on a picture automatically and then uses zoom and pan motions on this picture to automatically provide close ups to the viewer. The method focuses on representing images such as photos, not document images. Thus, the method is image-based only, and does not communicate document information through audio channel. For more information, see Wang et al., "MobiPicture—Browsing Pictures on Mobile Devices," ACM MM '03, Berkeley, November 2003 and Fan et al., "Visual Attention Based Image Browsing on Mobile Devices," International Conference on Multimedia and Exp, vol. 1, pp. 53-56, Baltimore, M.D., July 2003.

Conversion of documents to audio in the prior art mostly focuses on aiding visually impaired people. For example, Adobe provides a plug-in to Acrobat reader that synthesizes PDF documents to speech. For more information, see Adobe, PDF access for visually impaired. Guidelines are available on how to create an audiocassette from a document for blind or visually impaired people. As a general rule, information that is included in tables or picture captions is included in the audio cassette. Graphics in general should be omitted For more information, see "Human Resources Toolbox," Mobility International USA, 2002. Some work has been done on developing a browser for blind and visually impaired users. One technique maps a graphical HTML document into a 3D virtual sound space environment, where non-speech auditory cures differentiate HTML documents. For more information, see Roth et al., "Auditory browser for blind and visually impaired users." CHI '99, Pittsburgh, Pa., May 1999. In all the applications for blind or visually impaired users, the goal appears to be transforming as much information as possible into the audio channel without having necessarily constraints on the channel and giving up on the visually channel completely.

Other prior art techniques for use in conversion of messages includes U.S. Pat. No. 6,249,808, entitled "Wireless Delivery of Message Using Combination of Text and Voice," issued Jun. 19, 2001. As described therein, in order for a user to receive a voicemail on a handheld device, a voicemail message is converted into a formatted audio voicemail message and formatted text message. The portion of the message that is converted to text fills the available screen on the handheld device, while the remainder of the message is set as audio.

SUMMARY OF THE INVENTION

A method, apparatus and article of manufacture for assisting a user with authoring a multimedia representation of documents. In one embodiment, the method comprises displaying one or more visual, audible, or audiovisual document elements from an input document in graphical user interface; and selecting one or more elements and for inclusion in a multimedia representation.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Figure 1A:
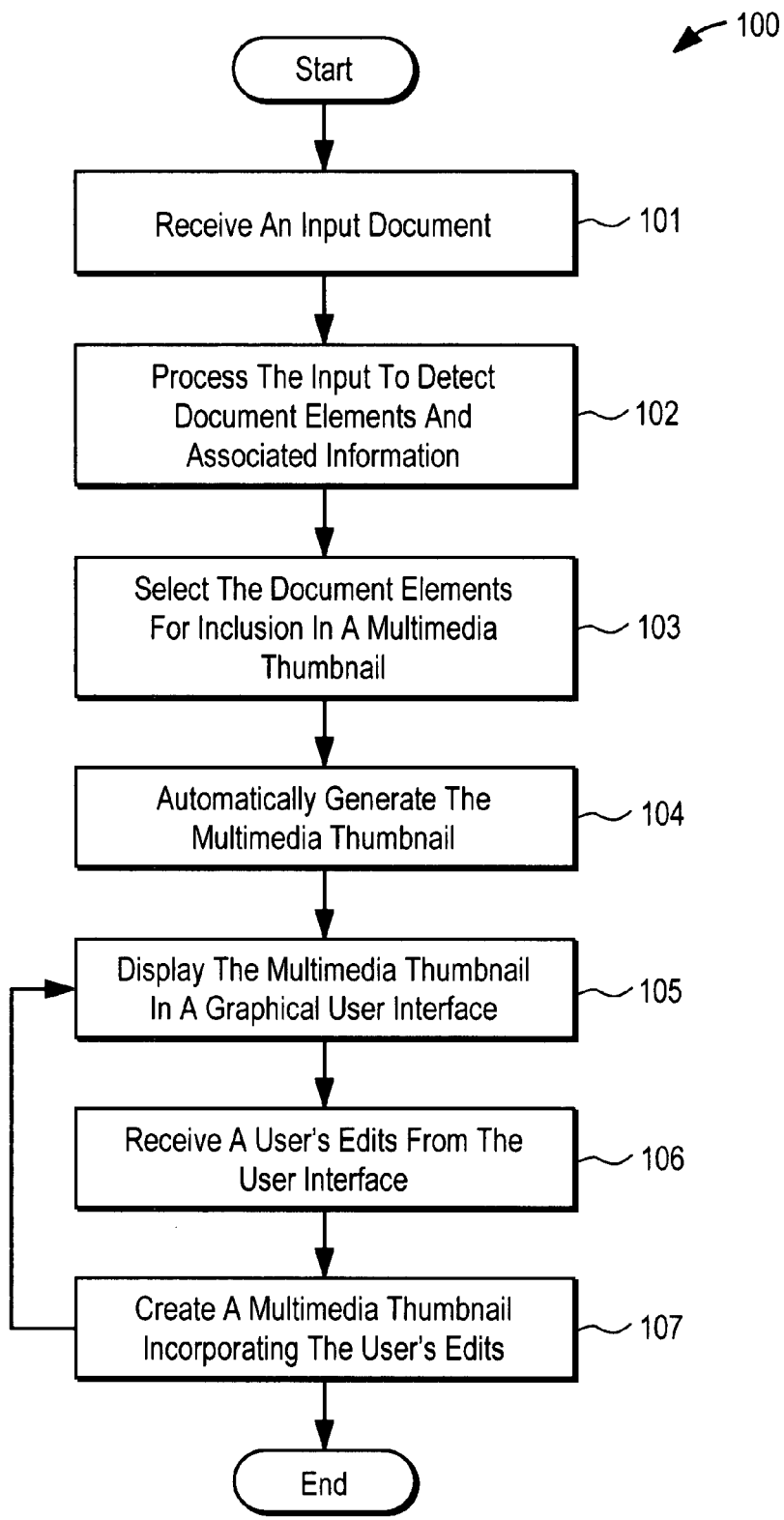
FIG. 1A is a flow diagram of one embodiment of a process for enabling a user to author a multimedia representation of a document.

A method and apparatus for assisting a user to author multimedia representations of documents, referred to herein as Multimedia Thumbnails (MMNails), are described. In one embodiment, MMNails contain the most important visual and audible (e.g., keywords) elements of a document and present these elements in both the spatial domain and the time dimension. An MMNail results from automatically analyzing, selecting and synthesizing information considering constraints given by the output device (e.g., size of display, limited image rendering capability) or constraints on an application (e.g., limited time span for playing audio).

In one embodiment, the multimedia representation generation process includes extracting multimedia information from still image documents (visual and audible), assigning of importance and time attributes to visual and audible information segments, and optimizing multimedia information for visual and audio channels given device and application constraints. The term "audible information" herein refers to the information that is convertible to audio. Thus, MMNails use both channels. Depending on the device or user preference, one of the two channels may be preferred over the other. As a result, MMNails utilize both the visual and audio channel of the device to present a representation of the document in a limited display and in a limited time-frame, and reduce, and potentially minimize, the interaction required by the user. In contrast to prior art approaches, the original document may be a still image with no multimedia content attached.

In one embodiment, the automatically generated MMNails can be manually or semi-manually edited by a user in a graphical user interface (GUI). This allows the user to decide the audio and visual portions to be included in the multimedia representation, select the type of operations performed on those portions (e.g., synthesize to speech, zoom-in, pan-over, etc.), and define a complete navigation path of the multimedia representation.

A navigation path defines how audible, visual, and audiovisual elements are presented to the user in a time dimension in a limited display area. It also defines the transitions between such elements. A navigation path may include ordering of elements with respect to start time, locations and dimensions of document elements, the duration of focus of an element, the transition type between document elements (e.g., pan, zoom, fade-in), and the duration of transitions, etc. This may include reordering the set of the audible, visual and audiovisual document elements in reading order.

User edits may be performed in the context of a document page showing the location of the document elements on which a thumbnail is based. User edits can also be performed in a dialog box that accepts user input and provides various options to the user. In one embodiment, the final MMNail(s) may be played back in a multi-layered fashion under user control. For example, a user may switch between an MMNail playback mode and a full-document browsing mode, using a control mechanism provided by a user interface.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer systems registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM") random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1A is a flow diagram 100 of one embodiment of a process for enabling a user to author multimedia representations of documents. The process is performed by processing logic that may comprise hardware (e.g., circuitry, dedicated logic, etc.), software (such as is run on a general purpose computer system or a dedicated machine), or a combination of both.

Referring to FIG. 1A, the process begins by processing logic receiving an electronic version of an input document (not necessarily containing video or audio data) (processing block 101). The input may additionally include metadata of the document. Examples of the input metadata include the background music of the document, author names, author pictures, publication name and date access information, image and scan resolution, encryption information, descriptors, etc. The document may be an electronic description, rendered images, or a combination of both. The input document may be any document representations rendered in realtime or non-realtime, including, but not limited to, postscript, TIFF images, PDF files, Microsoft Word files, HyperText Markup Language (HTML) web pages, non-document images (e.g., whiteboard images), presentation files (e.g., Microsoft PowerPoint), and spreadsheet files (e.g., Microsoft Excel). The input document(s) may come from the results of a search. That is, a search is performed and using one or more documents that were the results of the search, a multimedia thumbnail is generated.

The processing logic processes the input to detect visual, audible, and audiovisual elements of the document and associated information (e.g., the location of the document elements in the input document) (processing block 102). In one embodiment, the processing logic detects the visual, audible, and audiovisual document elements by determining visual focus points (VFPs) and/or important audible document information (ADIs). Given the VFPs and the ADI, along with device and application constraints (e.g., display size, a time constraint), the processing logic selects one or more elements of the visual, audible, and audiovisual document elements to be included in the output representation (e.g., a multimedia thumbnail) (processing block 103). In one embodiment, the selection is optimized to include the preferred visual and audible information in the output representation, where preferred information may include important information in the document, user preferred, important visual information (e.g., figures), important semantic information (e.g., title), key paragraphs (output of a semantic analysis), and document context. Important information may include resolution sensitive areas of a document, After selection, the processing logic synthesizes the information into visual data (for the visual channel, or representation) and/or audio data (for the audio channel, or representation) to create a multimedia thumbnail (processing block 104). Thus, a thumbnail, in this context, may refer to a representation in which material from the document is presented visually and audibly.

After the automatic generation of the multimedia thumbnail, the processing logic displays the multimedia thumbnail in a graphical user interface (processing block 105). Through the graphical user interface, processing logic receives a user's edits to the automatically generated multimedia thumbnail to modify (e.g., fine tune) the final representation (processing block 106). The processing logic modifies the multimedia thumbnail to based on the user's edits (processing block 107). The user may repeat the manual entry of edits until the resulting multimedia representation is satisfactory (processing blocks 105-107).

Figure 1B:
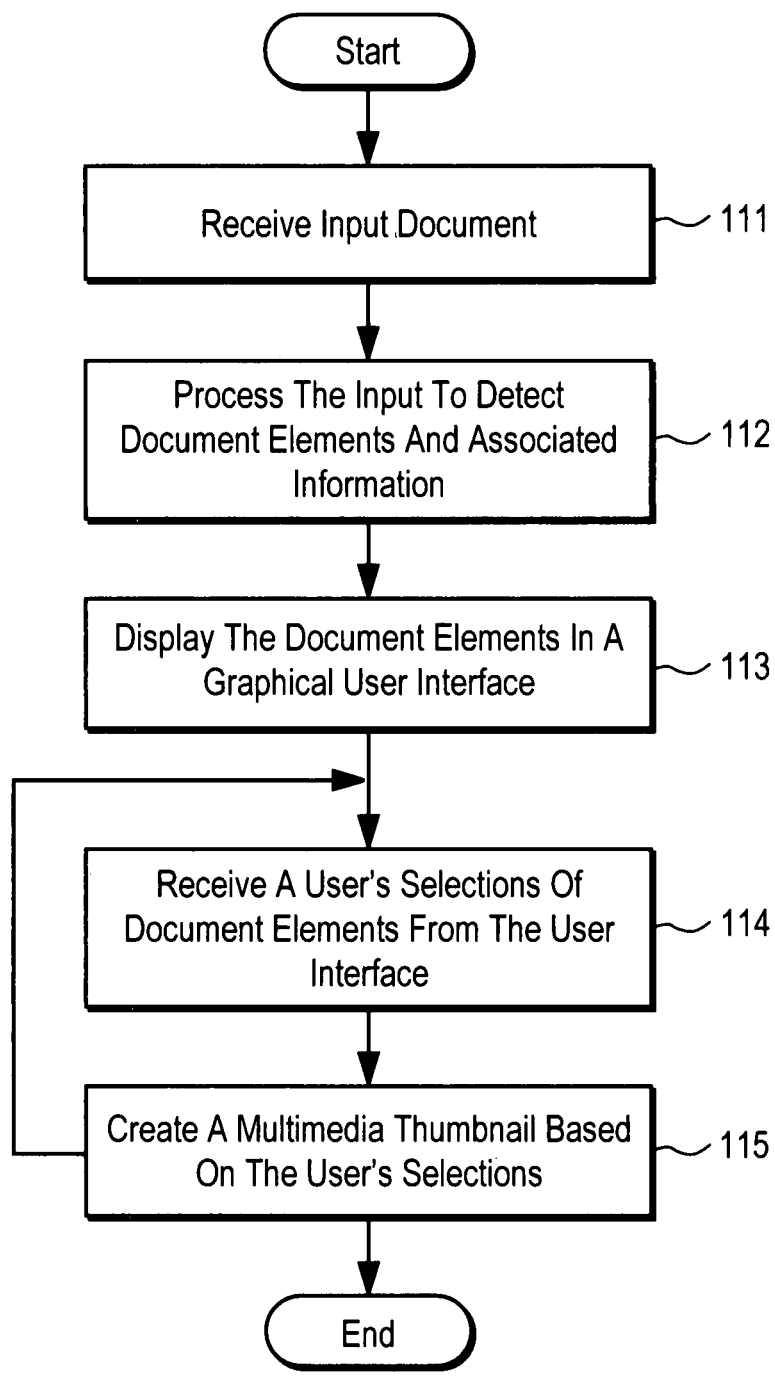
FIG. 1B is a flow diagram of one embodiment of an alternative process for enabling a user to author a multimedia representation of a document.

FIG. 1B is a flow diagram of another embodiment of another process for enabling a user to author a multimedia representation of documents. The process is performed by processing logic that may comprise hardware (e.g., circuitry, dedicated logic, etc.), software (such as is run on a general purpose computer system or a dedicated machine), or a combination of both.

Referring to FIG. 1D, the process begins by processing logic receiving an electronic version of an input document (not necessarily containing video or audio data) (processing block 111) where the input documents may be the same as set forth in FIG. 1A.

The processing logic processes the input to detect visual, audible, and audiovisual elements of the document and associated information (e.g. the location of the document elements in the input document) (processing block 112). In one embodiment, the processing logic detects the visual, audible, and audiovisual document elements by determining visual focus points (VFPs) and/or important audible document information (ADIs). The processing logic displays one or more visual, audible, or audiovisual document elements in a graphical user interface (processing block 113). Through the graphical user interface, processing logic receives a user's selections of document elements to appear in the automatically generated multimedia representation (processing block 114). The user may repeat the manual entry of edits and selections until the resulting multimedia representation is satisfactory (processing blocks 114-115).

After selection, the processing logic synthesizes the information into visual data (for the visual channel, or representation) and/or audio data (for the audio channel, or representation) to create a multimedia thumbnail (processing block 115). Thus, a thumbnail, in this context, may refer to a representation in which material from the document is presented visually and audibly.

Figure 2:
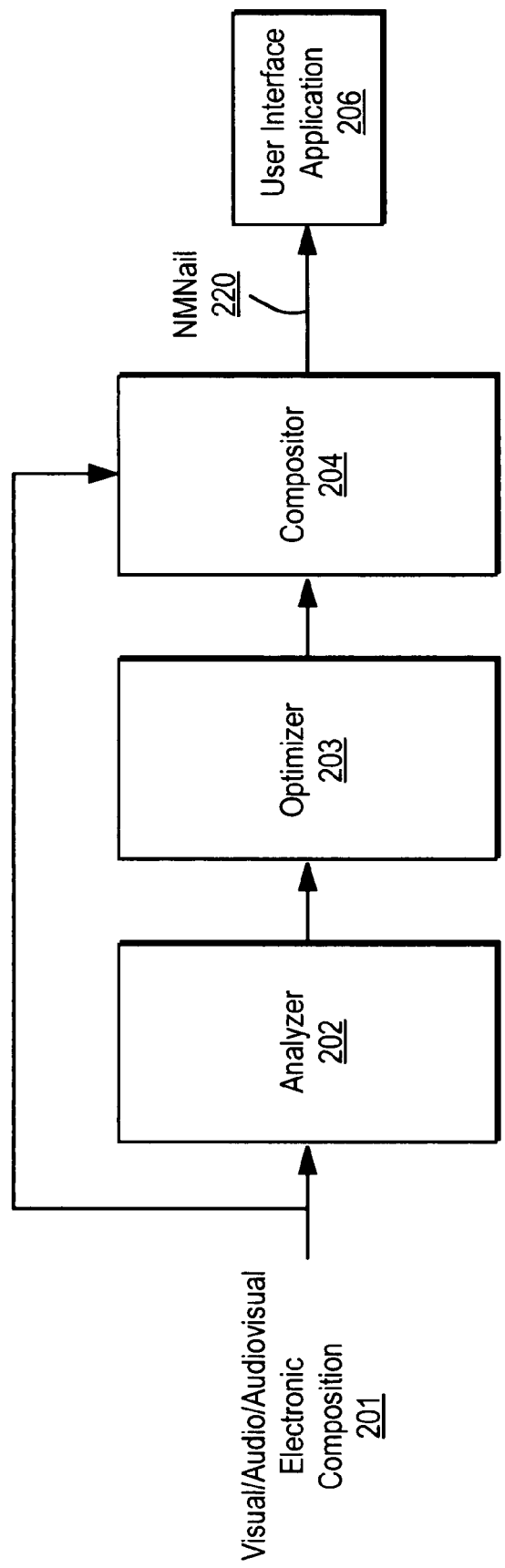
FIG. 2 is a block diagram of an embodiment of processing components for generating multimedia representation of documents.

FIG. 2 is a block diagram of an embodiment of processing components for automatically generating multimedia representations of documents. In one embodiment, each of the modules comprises hardware (e.g., circuitry, dedicated logic, etc.), software (such as is run on a general purpose computer system or a dedicated machine), or a combination of both.

Referring to FIG. 2, analyzer 203 receives document 201 and metadata 202. Metadata 202 may include author information and creation data, text (e.g., in a PDF file format where the text may be metadata and is overlaid with the document image), an audio or video stream, URLs, publication name, date, place, access information, encryption information, image and scan resolution, MPEG-7 descriptors etc. In response to these inputs, analyzer 203 performs pre-processing on these inputs and generates outputs information indicative of one or more visual focus points in document 101 along with information indicative of audible information in the document. The audible information may be information that is important in document 201 and/or metadata 202.

In one embodiment, analyzer 203 performs document pre-processing, metadata pre-processing, visual focus point identification, and important audible document information identification. In one embodiment, document preprocessing comprises performing one or more of optical character recognition (OCR), layout analysis and extraction, JPEG 2000 compression and header extraction, document flow analysis, font extraction, face detection and recognition, graphics extraction, and music notes recognition, which is performed depending on the application. In one embodiment, document pre-processing includes Expervision OCR software to perform layout analysis on characters and generates bounding boxes and associated attributes, such as font size and type. In another embodiment, bounding boxes of text zones and associated attributes are generated using ScanSoft software. In another embodiment, a semantic analysis of the text zone is performed in the manner described in Aiello M., Monz, C., Todoran, L., Worring, M., "Document Understanding for a Broad Class of Documents," International Journal on Document Analysis and Recognition (IJDAR), vol. 5(1), pp. 1-16, 2002, to determine semantic attributes such as, for example, title, heading, footer, and figure caption.

Metadata pre-processing may include parsing and content gathering. For example, in one embodiment, metadata pre-processing, given an author's name as metadata, extracts the author's picture from the world wide web (WWW) (which can be included in the MMNail later). In one embodiment, metadata pre-processing unit 203B performs XML parsing.

After pre-processing, visual focus point identification determines and extracts visual focus segments, while important audible document information identification determines and extracts important audible data.

In one embodiment, visual focus point identification identifies visual focus points based on OCR and layout analysis results from document pre-processing and/or XML parsing results from metadata pre-processing.

In one embodiment, visual focus point identification including performing analysis techniques set forth in U.S. patent application Ser. No. 10/435,300, entitled "Resolution Sensitive Layout of Document Regions," filed May 9, 2003, published Jul. 29, 2004 (Publication No. US 2004/0145593 A1) to identify text zones and attributes (e.g., importance and resolution attributes) associated therewith. Text zones may include a title and captions, which are interpreted as segments. In one embodiment, visual focus point identification determines the title and figures as well. In one embodiment, figures are segmented.

In one embodiment, audible document information identification identifies audible information in response to OCR and layout analysis results from document pre-processing and/or XML parsing results from metadata pre-processing.

Examples of visual focus segments include figures, titles, text in large fonts, pictures with people in them, etc. Note that these visual focus points may be application dependent. Also, attributes such as resolution and saliency attributes are associated with this data. The resolution may be specified as metadata. In one embodiment, these visual focus segments are determined in the same fashion as specified in U.S. patent application Ser. No. 10/435,300, entitled "Resolution Sensitive Layout of Document Regions," filed May 9, 2003, published Jul. 29, 2004 (Publication No. US 2004/0145593 A1), U.S. patent application Ser. No. 10/354,811, entitled "Reformatting Documents Using Document Analysis Information," filed Jan. 29, 2003, published Jul. 29, 2004 (Publication No. US 2004-0146199 A1) and U.S. patent application Ser. No. 11/023,142, entitled "Semantic Document Smartnails," filed Dec. 22, 2004, published Jun. 22, 2006 (Publication No. US 2006-0136491 A1), all incorporated herein by reference. In another embodiment, the visual focus segments are determined in the same manner as described in Le Meur, O., Le Callet, P., Barba, D., Thoreau, D., "Performance assessment of a visual attention system entirely based on a human vision modeling," Proceedings of ICIP 2004, Singapore, pp. 2327-2330, 2004. Saliency may depend on the type of visual segment (e.g., text with large fonts may be more important than text with small fonts, or vice versa depending on the application). The importance of these segments may be empirically determined for each application prior to MMNail generation. For example, an empirical study may find that the faces in figures and small text are the most important visual points in an application where the user assesses the scan quality of a document. The salient points can also be found by using one of the document and image analysis techniques in the prior art.

Examples of audible information include titles, figure captions, keywords, and parsed metadata. Attributes, e.g., importance (saliency) and time attributes (duration after synthesizing to speech) are also attached to the audible information. Importance of audible segments may depend on its type. For example, an empirical study may show that the document title and figure captions are the most important audible information in a document for a "document summary application".

Some attributes of VFPs and ADIs can be assigned using cross analysis. For example, the time attribute of a figure (VFP) can be assigned to be the same as the time attribute of the figure caption (ADI)).

In one embodiment, audible document information identification includes performing Term Frequency-Inverse Document Frequency (TFIDF) analysis to automatically determine keywords based on frequency, such as described in Matsuo, Y., Ishizuka, M." Keyord Extraction from a Single Document using Word Co-occurrence Statistical Information, International Journal on Artificial Intelligence Tools, vol. 13, no.1, pp.157-169, 2004 or key paragraphs as in Fukumoto, F., Suzuki, Y., Fukumoto, J., "An Automatic Extraction of Key Paragraphs Based on Context Dependency," Proceedings of Fifth Conference on Applied Natural Language Processing, pp. 291-298, 1997. For each keyword, audible document information identifier 203D computes a time attribute as being the time it takes for a synthesizer to speak that keyword. In one embodiment, the time is computed by multiplying the number of characters by a speech-synthesizing constant, SSC. Instead of figuring out audio time for each word, an approximation for this time is generated by having a constant SSC that is multiplied by the number of characters. SSC may be found by feeding a test text document, which has $C_n$ number of characters, to the synthesizer measuring the time, $T_{audio}$, that is required to play back the synthesized audio and dividing this time by the number of characters, SSC=$T_{audio}$/$C_n$. The SSC constant may change depending on the language choice, synthesizer that is used and the synthesizer options (female vs. male voice, accent type, talk speed, etc).

In a similar fashion, audible document information identification includes computing time attributes for selected text zones, such as, for example, title, headings, and figure captions. Each time attribute is correlated with its corresponding segment. For example, the figure caption time attribute is also correlated with the corresponding figure segment. In one embodiment, each audible information segment also carries an importance attribute that may reflect the visual importance (based on font size and position on a page) or reading order in case of text zone, the frequency of appearance in the case of keywords, or the visual importance attribute for figures and related figure captions. In one embodiment, the importance attribute is calculated in the same way as described in U.S. patent application Ser. No. 10/435,300, entitled "Resolution Sensitive Layout of Document Regions," filed May 9, 2003, published Jul. 29, 2004 (Publication No. US 2004/0145593 A1), U.S. patent application Ser. No. 10/354,811, entitled "Reformatting Documents Using Document Analysis Information," filed Jan. 29, 2003, published Jul. 29, 2004 (Publication No. US 2004-0146199 A1) and U.S. patent application Ser. No. 11/023,142, entitled "Semantic Document Smartnails," filed Dec. 22, 2004, published Jun. 22, 2006 (Publication No. US 2006-0136491 A1), all incorporated herein by reference.

The visual focus segments and important audible information are used by optimizer 204. Optimizer 204 receives the visual focus segments and important audible information from analyzer 203, which includes the characterization of the visual and audible document information, and device characteristics, or one or more constraints (e.g., display size, available time span, user settings preference, and power capability of the device), and computes a combination of visual and audible information that meets the device constraints and utilizes the capacity of information deliverable through the available output visual and audio channels. In this way, optimizer 204 operates as a selector, or a selection mechanism.

In one embodiment, in response to visual and audible information segments from analyzer 203 and other inputs such as the display size of the output device and the time span, L, which is the duration of final multimedia thumbnail, optimizer 204 performs an optimization algorithm. The main function of the optimization algorithm is to first determine how many pages can be shown to the user, given each page is to be displayed on the display for 0.5 second, during the time span available. If the time left from the time span L is large enough after displaying each page, optimnizer 204 allocates time for zooming on the title of the document. If the visual information channel is completely occupied during this time, the only other choice for information delivery is the audio channel, which is used by synthesized speech of keywords. If the time span for "reading" keywords is limited, a selection of the keyword list is performed following the keyword importance values, i.e. sorting the keyword list with respect to importance and computing the cut off after one or more keywords by optimizing the filling of the one-dimensional time span interval via a linear packing/filling order approach applied to the keywords' time attributes.

If there is any time left after page flipping through the pages and title zooming, optimizer 204 sorts the captions of the figures based on their time attribute (duration when their captions are synthesized to speech) to fill the remaining available time.

In one embodiment, optimizer 204 then applies a linear packing/filling order approach in a manner well-known in the art to the sorted time attributes to select which figures will be included in the multimedia thumbnail. Still-image holding is applied to the selected figures of the document. During the occupation of the visual channel by image holding, the caption is "spoken" in the audio channel. After optimization, optimizer 204 re-orders the selected visual and audio segments with respect to the reading order.

An Example of an Optimizer

Figure 11:
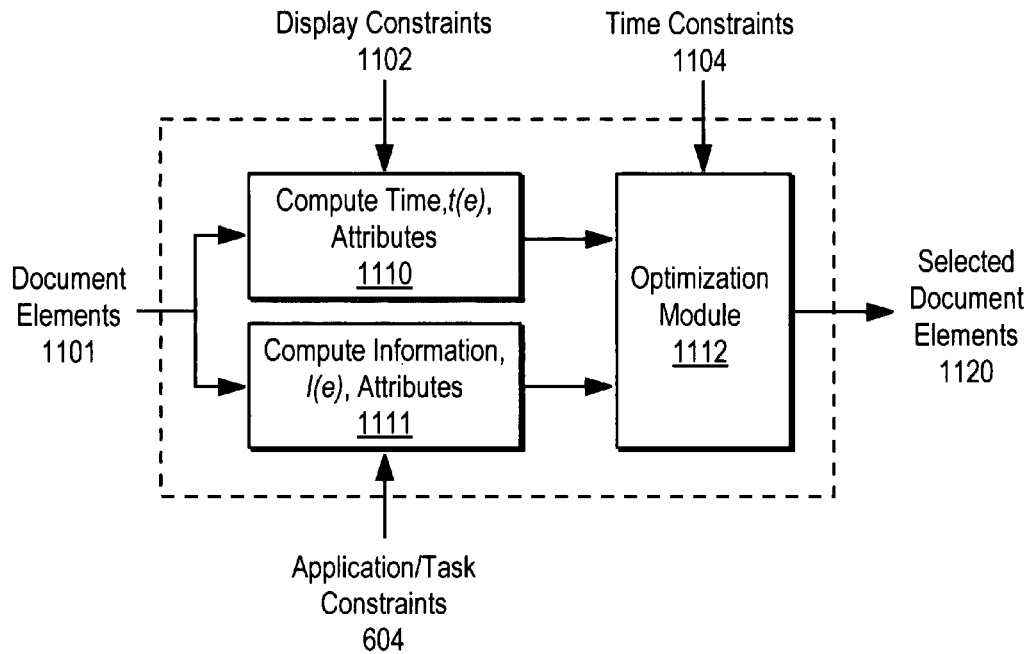
FIG. 11 is a block diagram of one embodiment of an optimizer.

The optimizer selects document elements to form an MMNail based on time, application, and display size constraints. An overview of one embodiment of an optimizer is presented in FIG. 11. Referring to FIG. 11, first, for each document element 1100 a time attribute is computed (1110), i.e. time required to display the element, and an information attribute is computed (1111), i.e. information content of the element. Display constraints 1102 of the viewing device are taken into account when computing time attributes. For example, it takes longer time to present a text paragraph in a readable form in a smaller viewing area. Similarly, target application and task requirements 1104 need to be taken into account when computing information attributes. For example, for some tasks the abstract or keyword elements can have higher importance than other elements such as a body text paragraph.

In one embodiment, the optimization module 1112 maximizes the total information content of the selected document elements given a time constraint (1103). Let the information content of an element e be denoted by I(e), the time required to present e by t(e), the set of available document elements by E, and the target MMNail duration by T. The optimization problem is $$\text{maximize} \sum_{e \in E} x(e) I(e) \quad (1)$$

$$\text{subject to} \sum_{e \in E} x(e) t(e) \leq T$$

$$x(e) \in \{0, 1\}, e \in E,$$

where the optimization variables x(e) determine inclusion of elements, such that x(e)=1 means e is selected to be included in the MMNail and x(e)=0 means e is not selected.

The problem (1) is a '0-1 knapsack' problem, therefore it is a hard combinatorial optimization problem. If the constraints $x(e) \in \{0,1\}$ to $0 \le x(e) \le 1$, $e \in E$ are relaxed, then the problem (1) becomes a linear program, and can be solved very efficiently. In fact, in this case, a solution to the linear program can be obtained by a simple algorithm such as described in R. L. Rivest, H. H. Cormen, C. E. Leiserson, Introduction to Algorithms, MIT Pres, MC-Graw-Hill, Cambridge Mass., 1997.

Let $x^*(e)$, $e \in F$, be a solution to the linear program. The algorithm is:

1. Sort the elements $e \in E$ according to the ratio $I(e)/t(e)$ in descending order, i.e., $$\frac{I(e_1)}{t(e_1)} \ge \ldots \ge \frac{I(e_m)}{t(e_m)},$$

where m is the number of elements in E;

2. Starting with the element $e_1$ select elements in increasing order ($e_1, e_2, \ldots$) while the sum of the time attributes of selected elements is smaller or equal T. Stop when no element can be added anymore such that the sum of time attributes of the selected elements is smaller or equal T.

3. If element e is selected denote it by $x^*(e)=1$, otherwise if it is not selected denote it by $x^*(e)=0$.

For practical purposes, approximation of the problem (1) should work quite well, as the individual elements are expected to have much shorter display time than the total MMNail duration.

Time Attributes

The time attribute, t(e), of a document element e can be interpreted as the approximate duration that is sufficient for a user to comprehend that element. Computation of time attributes depends on the type of the document element.

The time attribute for a text document element (e.g., title) is determined to be the duration of the visual effects necessary to show the text segment to the user at a readable resolution. In experiments, text was determined to be at least 11 pixels high in order to be readable on an LCD (Apple Cinema) screen. If text is not readable once the whole document is fitted into the display area (i.e. in a thumbnail view), a zoom operation is performed. If even zooming into the text such that the entire text region still fits on the display is not sufficient for readability, then zooming into a part of the text is performed. A pan operation is carried out in order to show the user the remainder of the text. In order to compute time attributes for text elements, first the document image is downsampled to fit the display area. Then a zoom factor Z(e) is determined as the factor that is necessary to scale the height of the smallest font in the text to the minimum readable height. Finally, the time attribute for a visual element e that contains text is computed as $$t(e) = \begin{bmatrix} SSC \times n_e, & Z(e) = 1 \\ SSC \times n_e + Z_c, & Z(e) > 1 \end{bmatrix}, \quad (2)$$

where $n_e$ is number of characters in e, $Z_C$ is zoom time (in our implementation this is fixed to be 1 second), and SSC (Speech Synthesis Constant) is the average time required to play back the synthesized audio character, SSC is computed as follows.

1. Synthesize a text segment containing k characters,
2. Measure the total time it takes for the synthesized speech to be spoken out, $\tau$, and
3. Compute $SSC = \tau/k$.

The SSC constant may change depending on the language choice, synthesizer that is used, and the synthesizer options (female vs. male voice, accent type, talk speed, etc). Using the AT&T speech SDK (AT&T Natural Voices Speech SDK, http://www.naturalvoices.att.com/), SSC is computed to be equal to 75 ms when a female voice was used. The computation of t(e) remains the same even if an element cannot be shown with one zoom operation and both zoom and pan operations are required. In such cases, the complete presentation of the element consists of first zooming into a portion of the text, for example the first $m_e$ out of a total of $n_e$ characters, and keeping the focus on the text for $SSC \times m_e$ seconds. Then the remainder of the time, i.e. $SSC \times (n_e - m_e)$ is spent on the pan operation.

The time attribute for an audible text document element e, e.g. a keyword, is computed as $$t(e) = SSC \times n_e, \quad (3)$$

where SSC is the speech synthesis constant and $n_e$ is the number of characters in the document element.

For computing time attributes for figures without any captions, we make the assumption that complex figures take a longer time to comprehend. The complexity of a visual figure element e is measured by the figure entropy H(e) that is computed extracting bits from a low-bitrate layer of the JPEG2000 compressed image as described in U.S. patent application Ser. No. 10/044,420, entitled "Header-Based Processing of Images Compressed Using Multi-Scale Transforms," filed Jan. 10, 2002, published Sep. 4, 2003 (U.S. Publication No. US 2003-0165273 A1).

Time attribute for a figure element is computed as $t(e) = \alpha H(e)/\overline{H}$, where H(e) is the figure entropy, $\overline{H}$ is the mean entropy, and $\alpha$ is a time constant. $\overline{H}$ is empirically determined by measuring the average entropy for a large collection of document figures. The time required to comprehend a photo might be different than that of a graph or a table, therefore, different $\alpha$ can be used for these different figure types. Moreover, high level content analysis, such as face detection, can be applied to assign time attributes to figures. In one embodiment, $\alpha$ is fixed to 4 seconds, which is the average time a user spends on a figure in our experiments.

An audiovisual element e is composed of an audio component, A(e), and a visual component, V(e). A time attribute for an audiovisual element is computed as the maximum of time attributes for its visual and audible components: $t(e) = \max(t(V(e)), t(A(e)))$, where $t(V(e))$ is computed as in (2) and $t(A(e))$ as in (3). For example, t(e) of a figure element is computed as the maximum of time required to comprehend the figure and the duration of synthesized figure caption.

Information Attributes

An information attribute determines how much information a particular document element contains for the user. This depends on the user's viewing-browsing style, target application, and the task on hand. For example, information in the abstract could be very important if the task is to understand the document, but it may not be as important if the task is merely to determine if the document has been seen before.

TABLE 1

Percentage of users who viewed different parts of the documents for document search and understanding tasks.

| Document Part | Viewing percentage for search task | Viewing percentage for understanding task |
|---|---|---|
| Title | 83% | 100% |
| Abstract | 13% | 87% |
| Figures | 38% | 93% |
| First page thumbnail | 83% | 73% |
| References | 8% | 13% |
| Publication name | 4% | 7% |
| Publication date | 4% | 7% |

Table 1 shows the percentage of users who viewed various document parts when performing the two tasks in a user study. This study gave an idea about how much users value different document elements. For example, 100% of the users read the title in the document understanding task, whereas very few users looked at the references, publication name and the date. In one embodiment, these results were used to assign information attributes to text elements. For example, in the document understanding task, the title is assigned the information value of 1.0 based on 100% viewing, and references are given the value 0.13 based on 13% viewing.

Two-Stage Optimization

After the time and the information attributes are computed for the visual, audible, and audiovisual elements, the optimizer of FIG. 11 produces the best thumbnail by selecting a combination of elements. The best thumbnail is one that maximizes the total information content of the thumbnail and can be displayed in the given time.

A document element e belongs to either the set of purely visual elements $E_v$, the set of purely audible elements $E_\alpha$, or the set of synchronized audiovisual elements $E_{\alpha v}$. A Multimedia Thumbnail representation has two presentation channels, visual and audio. Purely visual elements and purely audible elements can be played simultaneously over the visual and audio channel, respectively. On the other hand, displaying a synchronized audiovisual element requires both channels. In one embodiment, the display of any synchronized audiovisual element does not coincide with the display of any purely visual or purely audible element at any time.

Figure 12:
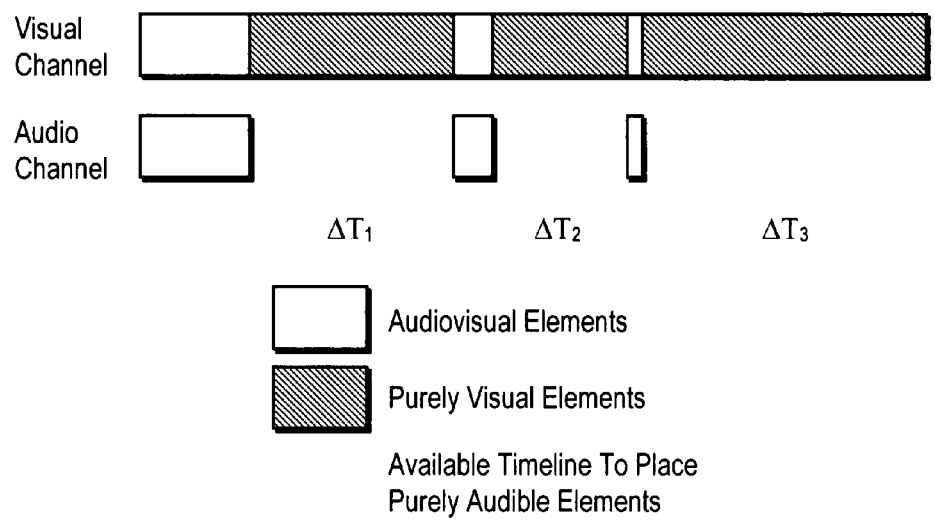
FIG. 12 illustrates a first stage of optimization where some pars of the audio channel are not filled.

One method to produce the thumbnail consists of two stages. In the first stage, purely visual and synchronized audiovisual elements are selected to fill the video channel. This leaves the audio channel partially filled. This is illustrated in FIG. 12. In the second stage we select purely audible elements to fill the partially filled audio channel.

The optimization problem of the first stage is $$\text{maximize} \sum_{e \in E_v \cup E_{av}} x(e) I(e) \quad (4)$$

$$\text{subject to} \sum_{e \in E_v \cup E_{av}} x(e) t(e) \leq T$$

$$x(e) \in \{0, 1\}, e \in E_v \cup E_{av}.$$

We solve this problem approximately using the linear programming relaxation as shown for the problem (1). The selected purely visual and synchronized audiovisual elements are placed in time in the order they occur in the document. The first stage optimization almost fills the visual channel, and fills the audio channel partially, as shown in FIG. 12.

In the second stage, purely audio elements are selected to fill the audio channel which has separate empty time intervals. Let the total time duration to be filled in the audio channel be $\hat{T}$. If the selected purely audible elements have a total display time of approximately $\hat{T}$, it is difficult to place the elements in the audio channel because the empty time duration $\hat{T}$ is not contiguous. Therefore a conservative approach is taken and optimization is solved for a time constraint of $\beta \hat{T}$, where $\beta \in [0,1]$. Further, only a subset of purely audio elements, $\hat{E}_\alpha$, are considered to be included in the MMNail. This subset is composed of audio elements that have a shorter duration than the average length of the separated empty intervals of the audio channel, i.e., $\hat{E}_\alpha = \{e \in E_\alpha | t(e) \leq \gamma \hat{T}/R\}$, where $\gamma \in [0,R]$ and R is the number of separated empty intervals. Therefore, the optimization problem of the second stage becomes $$\text{maximize} \sum_{e \in \hat{E}_a} x(e) I(e) \quad (5)$$

$$\text{subject to} \sum_{e \in \hat{E}_a} x(e) t(e) \leq \beta \hat{T}$$

$$x(e) \in \{0, 1\}, e \in \hat{E}_a.$$

The problem is of the type (1) and it is approximately solved using the linear programming relaxation as shown earlier. In our implementation $\beta = \frac{1}{2}$ and $\gamma = 1$.

It is possible to formulate a one step optimization problem to choose the visual, audiovisual, and the audible elements simultaneously. In this case, the optimization problem is $$\text{maximize} \sum_{e \in E_a \cup E_v \cup E_{av}} x(e) I(e) \quad (6)$$

$$\text{subject to} \sum_{e \in E_a \cup E_{av}} x(e) t(e) \leq T$$

$$\sum_{e \in E_v \cup E_{av}} x(e) t(e) \leq T$$

$$x(e) \in \{0, 1\}, e \in E_a \cup E_v \cup E_{av},$$

where x(e), $e \in E_\alpha \cup E_v \cup E_{\alpha v}$, are the optimization variables. The greedy approximation described to solve the relaxed problem (1) will not work to solve this optimization problem, but the problem can be relaxed and any generic linear programming solver can be applied. The advantage of solving the two stage optimization problem is that inclusion of user or system preferences into the allocation of the audio becomes independent of the information attributes of the visual elements and allocation of the visual channel.

Note that the two stage optimization described herein gives selection of purely visual elements strict priority over that of purely audible elements. If it is desired that audible elements have priority over visual elements, the first stage of the optimization can be used to select audiovisual and purely audible elements, and the second stage is used to optimize selection of purely visual elements.

Syntheses

Compositor 205 composes the final multimedia thumbnail. In one embodiment, synthesizer 205 composes the final multimedia thumbnail by executing selected multimedia processing steps determined in optimizer 204. In one embodiment, compositor 205 receives a file, such as, for example, a plain text file or XML file, having the list of processing steps. In another embodiment, the list of processing steps may be sent to compositor 205 by some other means such as, for example, through socket communication or com object communication between two software modules. In yet another embodiment, the list of processing steps is passed as function parameters if both modules are in the same software. The multimedia processing steps may include the "traditional" image processing steps crop, scale, and paste, but also steps including a time component such as page flipping, pan, zoom, and speech & music synthesis.

In one embodiment, compositor 205 comprises a visual synthesizer, an audio synthesizer, and a synthesizer/composer. Compositor 205 uses visual synthesis to synthesize the selected visual information into images and sequence of images, audio synthesizer to synthesize audible information into speech, and then synchronizer/composer to synchronize the two output channels (audio and visual) and compose MMNail 220. In one embodiment, for the visual composition including sequences of images (without audio) such as zoom and page flipping is performed using Adobe AfterEffects, while synchronizer/composer uses Adobe Premier. In one embodiment, audio synthesizer uses Carnegie-Mellon University speech synthesizing software (e.g., FestVox) to create sound for the audible information.

In one embodiment, compositor 205 does not synchronizer and compose into one output. In such a case, the output of compositor 205 may be output as two separate streams, one for audio and one for visual.

The outputs of synchronizer/composer may be combined into a single file and may be separate audio and video channels.

The automatically composed MMNail 220 may serve as a starting point of an authoring process directed by a user. The user may add new document elements, delete document elements, add a break point between document elements, group document elements, increase or reduce the number of document elements converted into audio or audiovisual and/or specify actions associated with each document element to compose a customized multimedia representation.

In one embodiment, the processing components of FIG. 2 further includes a user interface application 206 that renders a graphical user interface (GUI) to display MMNail 220 and receive edits from a user. The user edits cause the automatically generated selection of document elements, navigation path, and presentation actions associated with each of the document elements to be changed. The actions available to a user of user interface 220 include, but are not limited to, selecting document elements to add into or remove from the multimedia representation, selecting document elements to be converted to audio or audiovisual or to specify document elements that are not to be converted to audio or audiovisual, zooming, synthesizing to speech, panning over, and synchronizing with other document elements.

Figure 3:
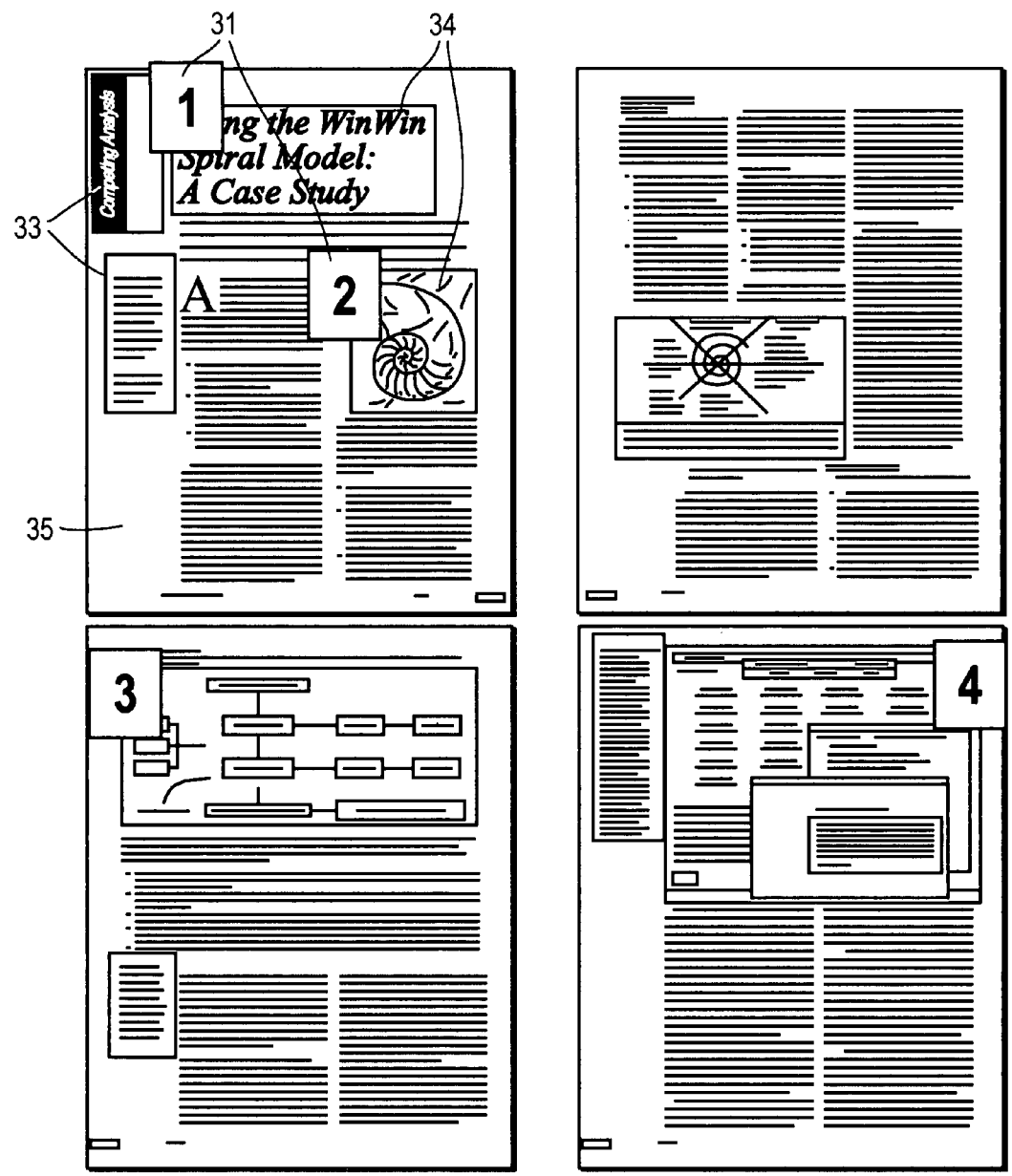
FIG. 3 is an embodiment of a graphical user interface (GUI) that displays the multimedia representation in the context of input documents.
Figure 4A:
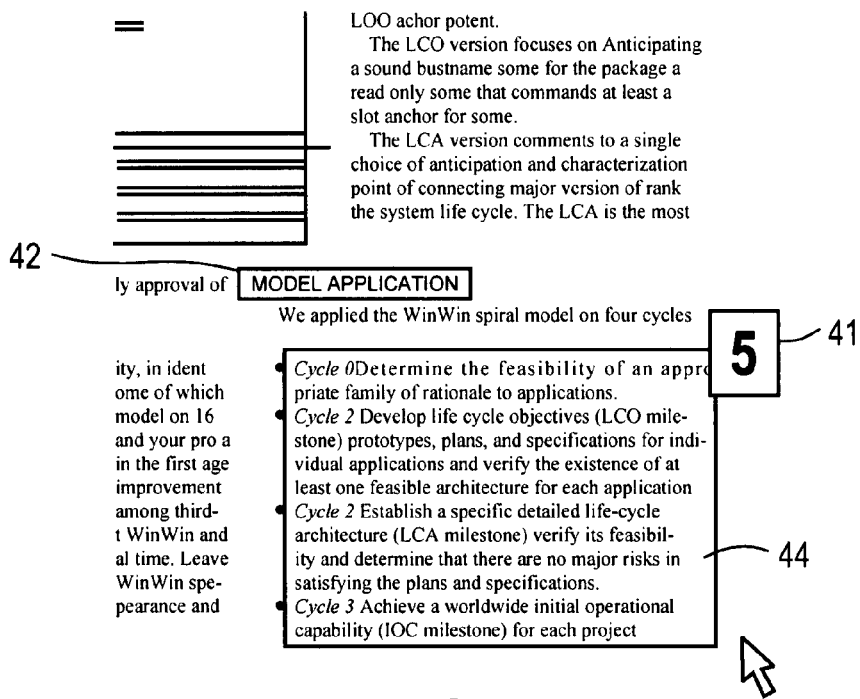
FIGS. 4A and 4B are embodiments of a GUI that allows a user to edit the multimedia representation.

In one embodiment, user interface application 206 displays MMNail 220 in a GUI in the context of a document page of the input document. FIG. 3 shows an example of a GUI that displays document pages 35 including document elements that are automatically detected and selected. The GUI also displays sequence numbers 31 that indicate the order in which the document elements are to be presented in the MMNail. Different visual indicia, e.g., colors, pattern, frames, animation, text styles (e.g., underline), font characteristics (e.g., bold, italic), etc., may be used to indicate a selection status of the document elements. For example, a document element that is selected for inclusion in the final MMNail is highlighted with a solid rectangle 34. A document element that is not selected by the user is highlighted with a dashed rectangle 33. A user can click on different document elements to select and or de-select the document elements with a cursor control device (e.g., a mouse) to compose the final multimedia representation. A separate window may be used to display document elements that are difficult to visualize in the document view (e.g., background music, keywords). Additionally, a user can also specify new document elements 42 and 44 for inclusion in the MMNail as illustrated in FIG. 4A.

Figure 4B:
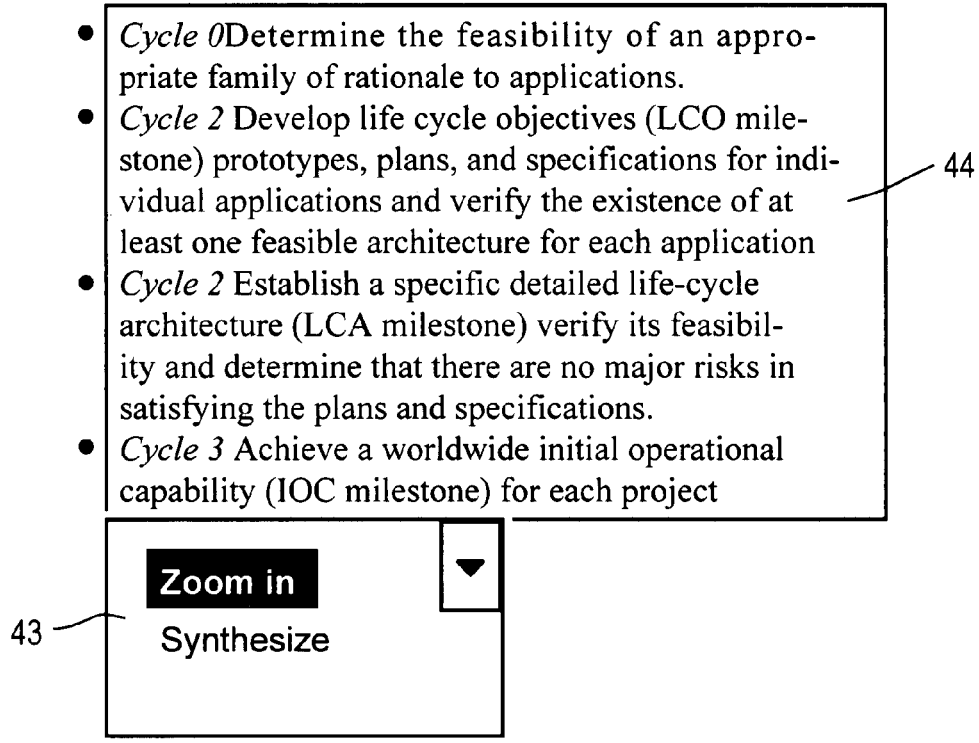

In one embodiment as shown in FIG. 4B, each document element is associated with a pull down menu 43 from which a user may determine a presentation action, (e.g., zooming, panning over, synthesizing to speech, synchronizing actions of multiple document elements, and other suitable actions). A user can assign a sequence number 41 to each document element. In one embodiment, this is done by having a pop-up appear to allow a user to enter a sequence number once an element has been selected by a cursor control device (e.g., a mouse). In another embodiment, single or double clicking to a document element may include or exclude a document element and sequence numbers can be automatically updated based on an algorithm, which may be based on reading order or information values, etc.

More advanced options can also be selected, including but not limited to, zooming path, zooming speed, panning path, panning speed, synthesizer voice, synthesizer speed, redaction (block out of secure material) from viewing, stretching a time interval to allow more time for display. A user can also group document elements, assign a single action and/or an ordering for the grouped elements. Parameters for actions such as the zoom-in factor and the path for panning can be content dependent and can be automatically calculated. For example, a user only needs to specify the action of zooming in, and an MMNail pre-processor automatically computes an appropriate zoom-in factor to make the text readable in the target resolution. For example, on a small display, the action of "zooming in" may be automatically processed as equivalent to "zooming and panning."

In one embodiment, the most important elements in the MMNail are tagged. A user can also add tags (meta data) to elements of choice. Those metadata can be used during playback to skip from one tagged element to another, not playing the elements between two tagged elements. Furthermore, tags can be used for retrieval of a multimedia thumbnail or its corresponding document.

Other visualization techniques can also be used in the GUI. For example, instead of displaying the selected document elements collectively on a page, the document elements could be displayed as separate items. Also, a timeline with one or more visual/audio channels, which is a common visualization technique for video editing software (e.g., Adobe Premiere®), can be employed to specify the selection and ordering of the document elements.

In addition to the original input document, the GUI may allow the user to select other relevant visual, audible, and/or audiovisual information for inclusion in the final multimedia representation. Examples may include relevant audio/video clips, links, and images, such as pictures of authors, music, overlaid text, advertisement text/clips, etc.

Figure 5:
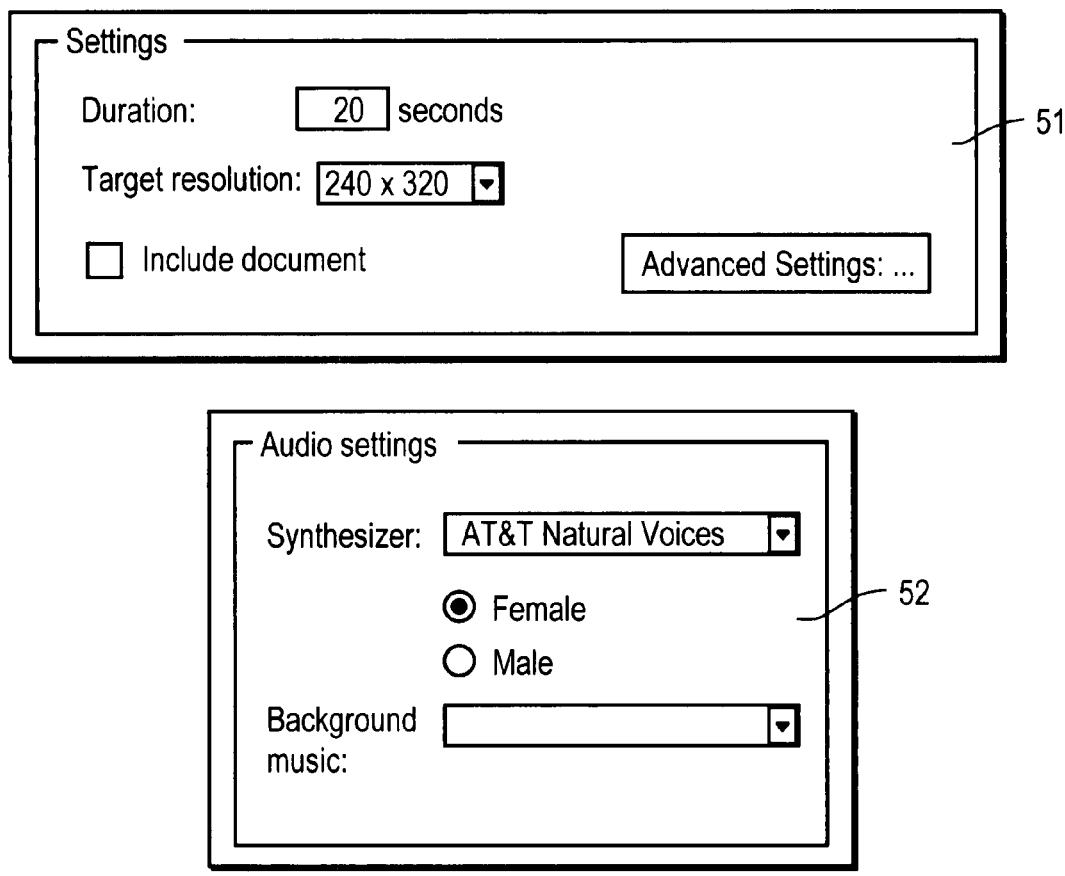
FIG. 5 is an embodiment of a dialog box for a user to specify the parameters of the multimedia representation.

In one embodiment, the GUI provides one or more user interface elements for a user to modify the parameters of the multimedia representation. The parameters can be used by the processing components of FIG. 2 to adjust the initial automatic selection of the document elements. FIG. 5 shows an example of a dialog box 51 for setting presentation parameters (e.g., duration of the presentation, resolution of the target display, whether to include input document in the presentation, other advanced settings, etc.). A dialog box 52 allows the user to enter audio setting parameters (e.g., type of the synthesized voice, gender of the synthesized voice, background music, other suitable parameters, etc.).

The GUI also provides one or more dialog boxes for a user to print an MMNail to a target output device or medium, including but not limited to, a storage location on a mobile device, a local disk, a multi-function peripheral (MFP), a universal resource locator (URL) for publishing, and a printer location.

Figure 6:
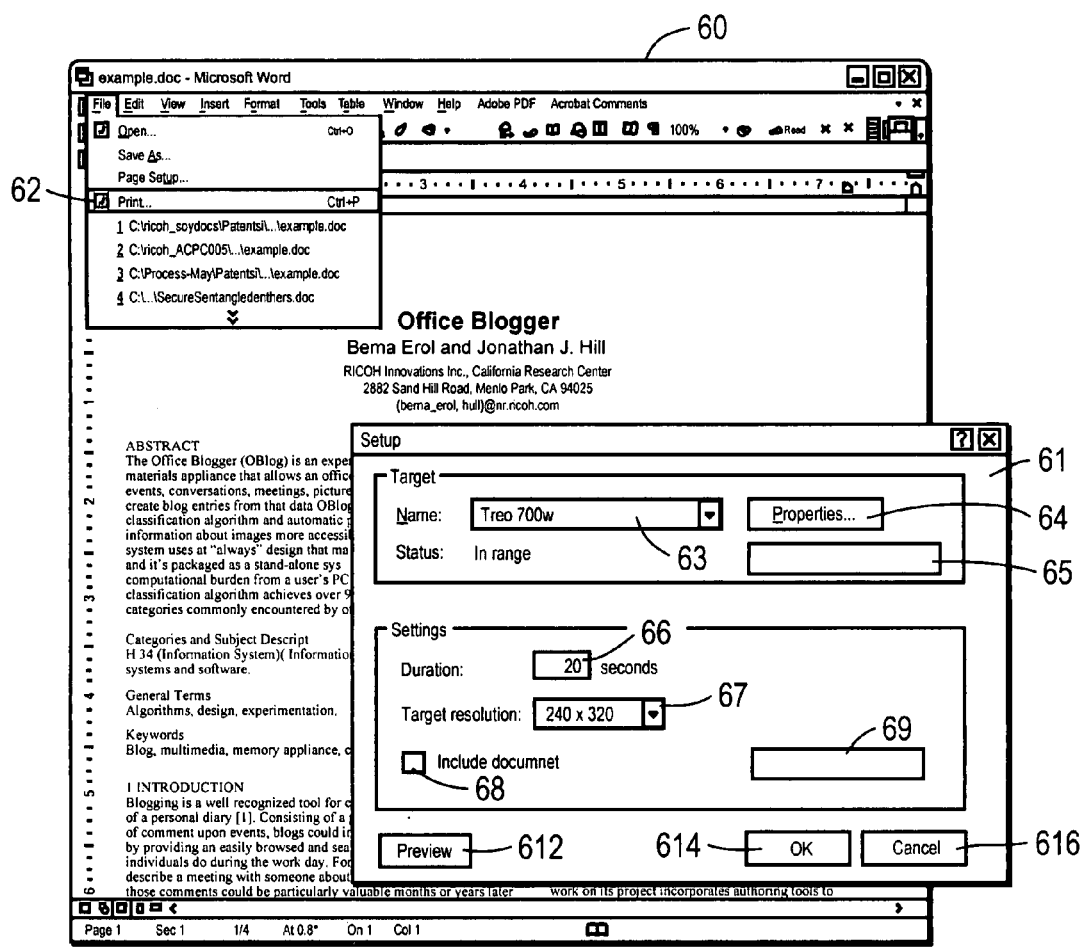
FIG. 6 is an embodiment of a dialog box for a user to customize the printing of the multimedia representation to a target.

FIG. 6 shows a setup dialog box 61 for setting up the printing. In the example as shown, dialog box 61 is invoked by selecting a print option 62 in a document processing window 60. Dialog box 61 allows a user to enter a target output device 63. The target output medium could be a storage location on a mobile device, local disk, MFP, a URL or similar locator for publishing, a printer location, etc. Mobile devices in range (e.g., Bluetooth range, WiFi range) can be automatically detected and added to a target device list 65. Other printing properties 64 can also be shown.

In one embodiment, dialog box 61 accepts user-specified parameters (e.g., a duration of presentation 66 and a target resolution 67, target device memory and processor speed (which may have an effect on how MMNail is generated, e.g., if target device is slow then some animations may be omitted), MMNail profile (for example 'audio profile' may optimize MMNail presentation in such a way that more information is communicated through audio, which is useful when driving a car vs a 'visual profile' where most information is communicated through the visual channel, available bandwidth (e.g., modem, LAN, wireless), etc.)) for the presentation of the MMNail. These parameters can be utilized by the optimization algorithm mentioned above in connection with FIG. 2 to select the document elements.

Based on the target device/medium, certain parameters can be automatically computed and populated (e.g., zoom-in factor, zooming speed, panning speed, etc.). A user can also specify a range of durations and target resolutions to allow scalability in the presentation. Dialog box 61 may also include a selector 68 to indicate whether to include the input document in the printing. Advanced settings can be displayed when a corresponding user interface element 69 is activated. Dialog box 61 includes a preview button 612 to allow a user to preview the MMNail, an OK button 614 for accepting the current user input, and a cancel button 616 for canceling the printing. Other options may also be included.

Figure 7:
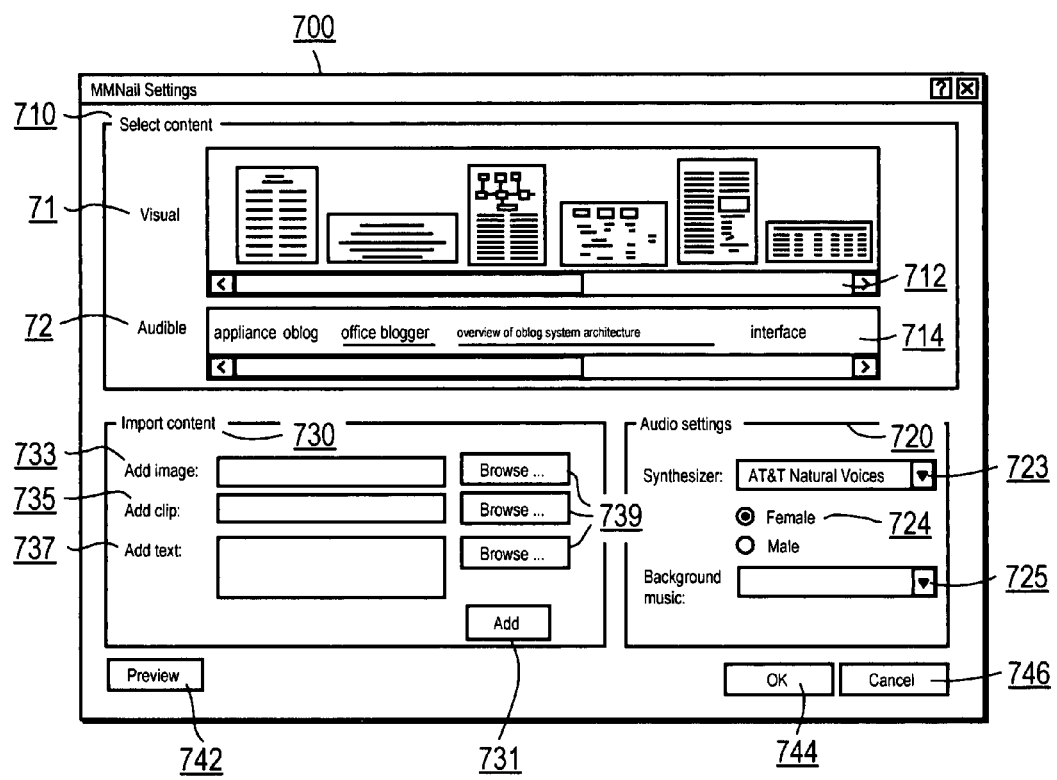
FIG. 7 is another embodiment of a dialog box for a user to specify the print settings.

FIG. 7 shows an embodiment of a dialog box 700 that displays advanced settings of the MMNail. Dialog box 700 may be integrated as part of dialog box 61, or a separated dialog box, as shown. For example, dialog box 700 may be invoked when user interface element 69 in dialog box 61 of FIG. 6 is activated. Dialog box 700 includes a content selection section 710, an audio setting section 720, and an import content section 730. Content selection section 710 includes a visual element window 71 and an audible element window 72. Visual element window 71 displays a list of the document elements that can be visualized. Audible element window 72 displays a list of the document elements that are audible (e.g., keywords). The visual element list and the audible element list may include all of the document elements that are automatically detected and selected, e.g., by the processing components of FIG. 2. Scroll bars 712 and 714 associated with each of windows 71 and 72 allow a user to view the document elements that do not fit into the space provided by the windows. A user can select and de-select document elements in windows 71 and 72 to determine the MMNail printed to the target device/medium.

Audio setting section 720 as shown is similar to audio setting dialog box 52 of FIG. 5. A user can enter audio setting parameters (e.g., type of the synthesized voice 723, gender of the synthesized voice 724, background music 725, and other suitable parameters, etc.) into audio setting section 720.

Import content section 730 allows a user to input various types of metadata that can be included with the selected document elements in the MMNail. In one embodiment, the metadata includes content relevant to the MMNail but not in the input document (e.g., URLs, background music, and pictures of the authors). The metadata can hint to the important elements for presentation of the MMNail (e.g., specific figures or a part of a text), specify the path of a story (e.g., in a newspaper), or specify the complete navigation path of the MMNail (e.g., the slides of a PowerPoint document to be included in an MMNail representation).

In one embodiment, dialog boxes 733, 735, and 737 indicate the locations of imported metadata, including images, clips, and texts, respectively. A browser button 739 associated with each of dialog boxes 733, 735, and 737 is used to locate the images, clips, and texts to be imported. To import the metadata, a user can click on an add button 731 to invoke an import interface.

Dialog box 700 also includes a preview button 742 to allow a user to preview the MMNail. Alternatively, a real time preview of the MMNail can be played in the same dialog box or in a separate window as the user modifies the MMNail contents. Dialog box 700 also includes an OK button 744 for accepting the current user input, and a cancel button 746 for canceling the printing. Other options may also be included.

In one embodiment, the graphical user interface allows a user to record voice annotation during authoring, and tagging of document elements.

After the final MMNail is composed and printed (sent) to a target device, a user can playback the MMNail on the target device. In one embodiment, the MMNail automatic navigation is combined with user-controlled document browsing, which produces a multi-layered presentation in a GUI of the target device. The term "multi-layered presentation" herein refers to a presentation that involves more than one level of details. For example, the original document from which the MMNail is generated represents one level of details and the document elements in the MMNail represent another layer of details. A user can initiate when to take over the MMNail playback and when to release control of the manual document browsing.

The GUI of the target device allows a user to browse a document in a document viewing interface and initiate the MMNail viewing when needed. In one embodiment, in the document viewing interface, a user manually navigates through the document pages (e.g., moving forward, moving backward, and panning over) and manually adjusts the size of the displayed elements using controls such as, for example, manual zoom in, zoom out, and panning provided by most document viewers. At a certain point, the user may identify a paragraph that he/she would like to read. The user may click on the paragraph to initiate an MMNail viewing interface. The MMNail viewing interface automatically zooms into the paragraph at a readable resolution. Alternatively, the MMNail viewing interface may automatically resize the paragraph such that the width or height of the paragraph fits into the width or height of the screen. In one embodiment, if some of the text in the multimedia representation is unreadable or too small, the audio is played setting forth the text or a summary of the text. Alternatively, keywords, the first sentence, random words, figure captions, etc., can be played so that the user can determine whether to zoom in or not.

In addition, the MMNail viewing interface may apply a panning speed proper for the user's speed of reading, which may be estimated by scaling the duration of synthesized speech. Panning can be left to right and up to down in the paragraph. After completing the MMNail viewing, of a paragraph, a figure, or any document element, the control may be given back to the user automatically. Alternatively, the MMNail viewing interface may continue playing back the next document element in a pre-determined reading order or, according to its navigation path, until receiving an indication from a user to stop the playback.

In one embodiment, a timer is added to the display to indicate the amount of time remaining in the time on a specific segment is to be displayed.

In one embodiment, the MMNail can be embedded into the input document file. A predetermined visual, audible, or audiovisual element in the MMNail is linked to a spatial region on a specific page of the input document. Navigation through the document using a combination of both the input document and an MMNail is made possible through the linkage.

Figure 8:
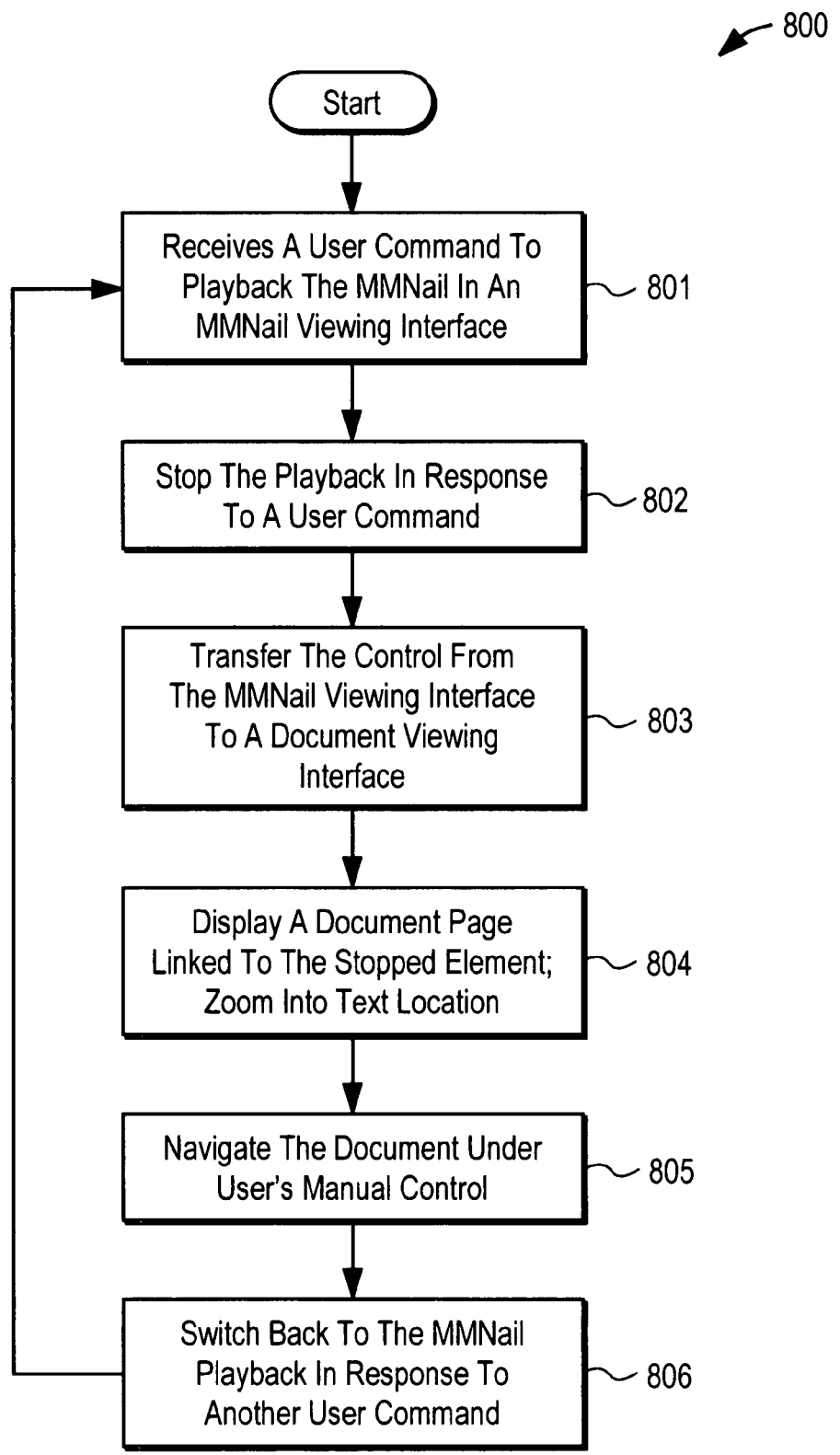
FIG. 8 is a flow diagram of one embodiment of a playback process for multi-layered multimedia representation of documents.

FIG. 8 is a flow diagram 800 of one embodiment of a process for playing back the MMNail as a multi-layered presentation. The process is performed by processing logic that may comprise hardware (e.g., circuitry, dedicated logic, etc.), software (such as is run on a general purpose computer system or a dedicated machine), or a combination of both.

Referring to FIG. 8, the process begins by processing logic receives a user command to playback the MMNail in an MMNail viewing interface (processing block 801). When the user enters a stop command into the MMNail viewing interface, processing logic stops the playback of the MMNail (processing block 802). In response to the stop command, processing logic transfers control from the MMNail viewing interface to a document viewing interface (processing block 803). Processing logic causes the document viewing interface to display the page of the input document linked to the stopped element of the MMNail (processing block 804). In addition, it may cause the viewing interface to zoom in and pan to the document part that the MMNail was last displaying. At this point, processing logic enables receipt of manual control inputs from the user interacting with the display of the input document (e.g., page flipping, page scrolling, zoom-in/out, and other suitable operations) (processing block 805). Subsequently, processing logic receives an indication the user wants switch back to the MMNail viewing interface when the user enters a play command (processing block 806). In this case, MMNail playback may continue from the time it was stopped, or continue from a time that shows content that is closest (in terms of location in the document) to the content the user is manually viewing.

In an alternative embodiment, the user starts in a document viewing interface and presses a button or uses another graphical user interface element to start playing the MMNail associated with the document. Like described in FIG. 8, the user is able to go between the two viewing modes.

Figure 9:
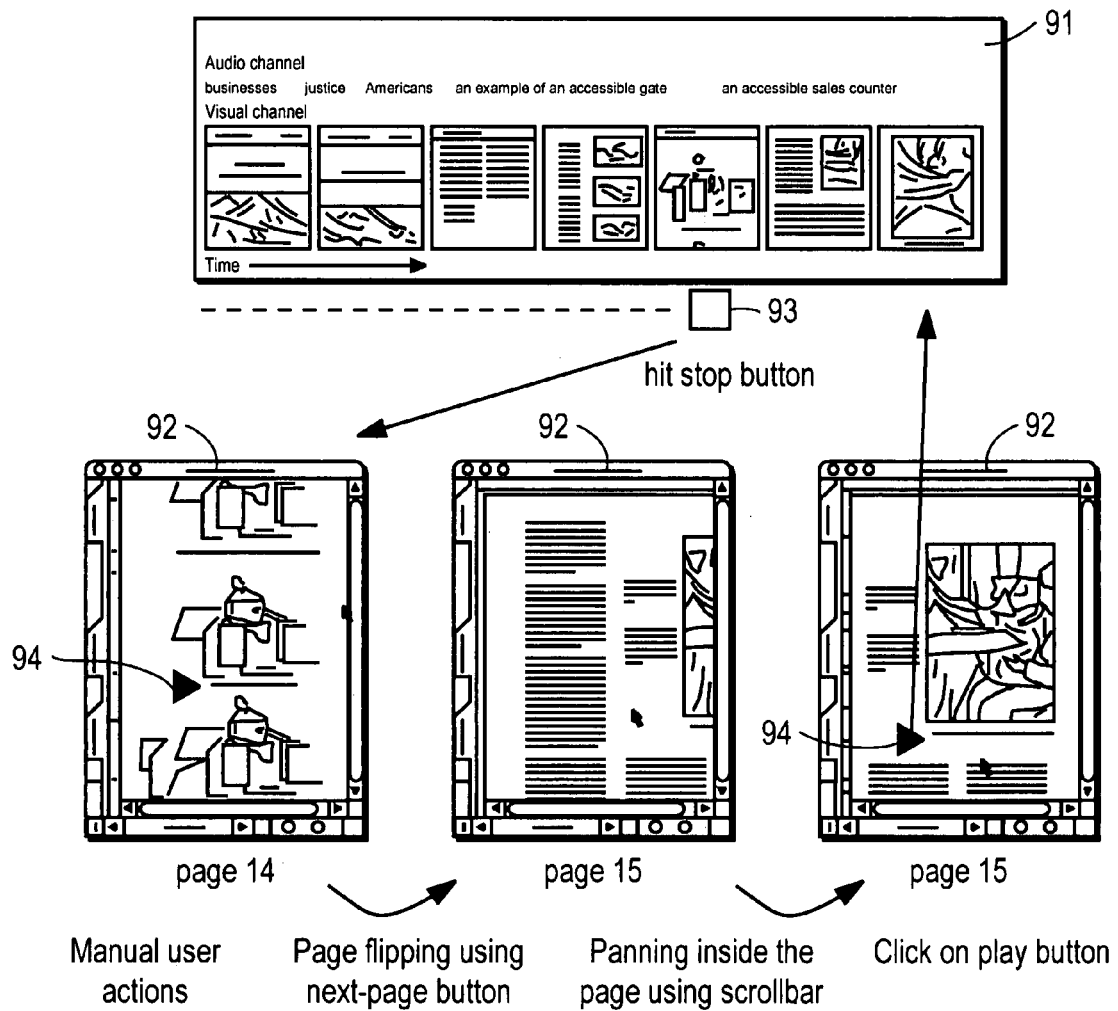
FIG. 9 shows an example of a playback sequence of the multi-layered multimedia representation.

FIG. 9 shows an example of a playback sequence of a combination of an MMNail and an input document from which the MMNail is generated. The playback sequence involves the use of an MMNail viewing interface 91 and a document viewing interface 92. A user is provided with a stop indicator 93 to stop the playback of the MMNail. For example, if that stop action is performed, the display switches from MMNail viewing interface 91 to document viewing interface 92. The MMNail playback is stopped at a document element that is linked to a page of the input document. If the stopped element is an audiovisual or a visual element, the page associated with the element is displayed and may be zoomed into the element at a readable resolution in document viewing interface 92. If the stopped element is an audio element that does not have any associated visual document content, the input document may be opened at the first page or at the last audiovisual or visual element shown in the MMNail before stopping. Once in document viewing interface 92, the user can use manual actions to page through the input document. For example, the user can go to the next page using a next-page button in the user interface or the previous page using a back-page button in the user interface. In one embodiment, the user can also pan inside the page using a scrollbar. In the input document file there can be a play indicator 94 associated with an element contained in the MMNail. Thus, the user can browse the document in document viewing interface 92 and initiate the MMNail from the element that has associated play indicator 94.

In one embodiment, a user can browse a document in a convention document viewing interface and initiate multimedia representation viewing when needed. For example, in one embodiment, a user identifies a paragraph that he would like to read and clicks on it, and MMNail viewing is initiated where the document viewer automatically zooms into the paragraph to either a readable resolution or in a way that the width of the paragraph is equal to screen width (or height of the paragraph is equal to screen height). In one embodiment, proper panning is applied that is inline with the user's speed of reading (which may be estimated in the paragraph). The user can take back the full control of the browsing anytime. After the playback of one paragraph, a figure, etc. is finished, the control may be automatically given back to the user or the multi-media-representation may continue playing the next section, paragraph, figure, etc. in reading order or its navigation path.

In case the MMNail contains tagged elements, in one embodiment, a user can skim through those tagged elements of the MMNail to get a quick overview In one embodiment, a user's preferences, such as which parts of a document are viewed and how long they are viewed, can be stored and used for MMNail authoring and creation.

MMNail creation can be dependent on the selected content and a user ID. For example, in a common scenario, MMNail analyzer 203 of FIG. 2 determines the zoom factor and the pan operation necessary for displaying the text region in a readable resolution. The determination can be changed based on the user ID. For example, if the user has vision problems the smallest readable font size can be set at a larger size so that the user can read the MMNail contents easily.

An Example of Playback Interface

Figure 13A:
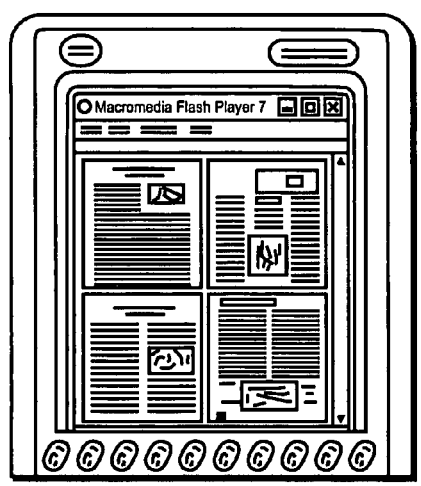
FIG. 13A illustrates an interface that displays for document browsing.
Figure 13B:
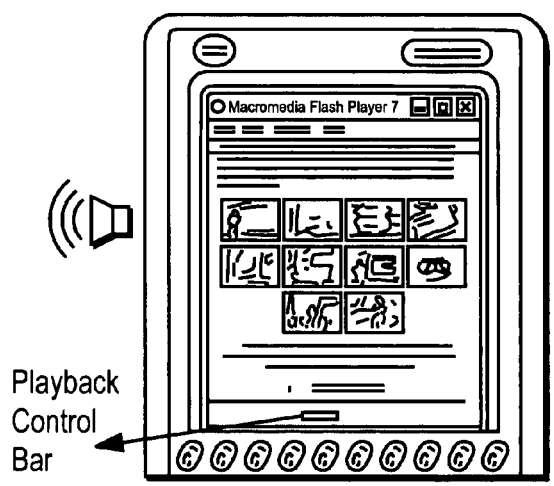
FIG. 13B illustrates an interface for element viewing.

In one embodiment, MMNail playback interface is implemented in Flash and compatible with smart phones running the Pocket PC OS 2003 and Windows Mobile operating systems. A document browser interface that displays the thumbnail of each document is shown in FIG. 13A. When a user selects a document thumbnail in order to view the MMNail representation, automated navigation is activated in the interface given in FIG. 13B. The user has control over playback with a control bar, which he can use to start, stop, go backward and forward in the MMNail timeline. In addition to the control bar, the user can also use the keypad of the device to pause and play MMNails and to move to the beginning of previous or next MMNail animation segment. This way, users have more control over the playback experience where they are able to skip less interesting parts and spend more time on more interesting sections.

In one embodiment of a MMNail interface, the user can have an option in the amount of detail the user could view For example, the user may initiate only a high level browsing where only the page thumbnails of a document are played back to the user. A user may initiate at anytime a more detailed viewing, where the automatic zooming into the elements on the displayed page is initiated. The up and down arrow buttons may be used to change the level during the MMNail playback. When the user initiates skipping to the next or previous segments, the level of browsing may be taken into account when displaying the next or previous item. For example, when the user is at the page level and wants to skip forward, the next page is shown. If the user is at a more detailed playback level, then the next figure or section heading is shown, etc. A user interface component may be used to display the user the current level and available levels of MMNail browsing.

In order to prevent users' feeling of being lost in the document, moving to a different document page can be visualized more explicitly by adding an animation of page flipping. A small overview of the document pages can also be presented at the top or the bottom of the screen and the MMNail path can be highlighted as it plays. A timer can be displayed to give a user an idea about how much time left for viewing each section. Therefore, if the user is done reading before the allowed time, they can simply skip and move on to the next section. Moreover, MMNails can be used in combination with a document or web page viewer to obtain the benefits of both automatic navigation and manual navigation. The document viewer may show the most important document elements with the right alignment and zoom factor based on the display size and user's estimated navigation time, but user may take over the playback at anytime to perform manual navigation.

Applications

The techniques described herein may be potentially useful for a number of applications. For example, the techniques may be used for web page viewing, presentation viewing, image viewing, or any combinations of them. The viewing may be performed on a number of devices, such as mobile devices and multi-function peripherals (MFPs).

For example, when performing interactive document browsing on a mobile device, the document browsing can be re-defined. For example, instead of zoom and scroll, operations may include, skipping, play, pause, fast forward, speedup, and slowdown and other operations that are typical in a video/audio player.

In another mobile device application when performing document viewing and reviewing on mobile devices, the techniques set forth herein may be used to allow a longer version of the MMNail (e.g., 15 minutes long) to be used to provide not only a multimedia representation but also understand the content of a document. This application seems to be suitable for devices with limited imaging capabilities, but preferred audio capability, such as, for example, cell phones. After browsing and viewing a document with a mobile device, in one embodiment, the mobile device sends it to a device (e.g., an MFP) at another location to have the device perform other functions on the document (e.g., print the document).

The other types of documents that can be presented as a multimedia representation are quite varied. Such a representation could be used to represent an outline of a document that is going to be presented. Also, these representations may be useful in allowing a salesman to go through a brochure to locate certain items (e.g., specifications). In one MFP application, the techniques described herein may be used for document representation. For example, when a user is copying some documents at the MFP, as the pages are scanned, an automatically computed document representation may be displayed to the user, giving a person a head start in understanding the content of the document.

An Exemplary Computer System

Figure 10:
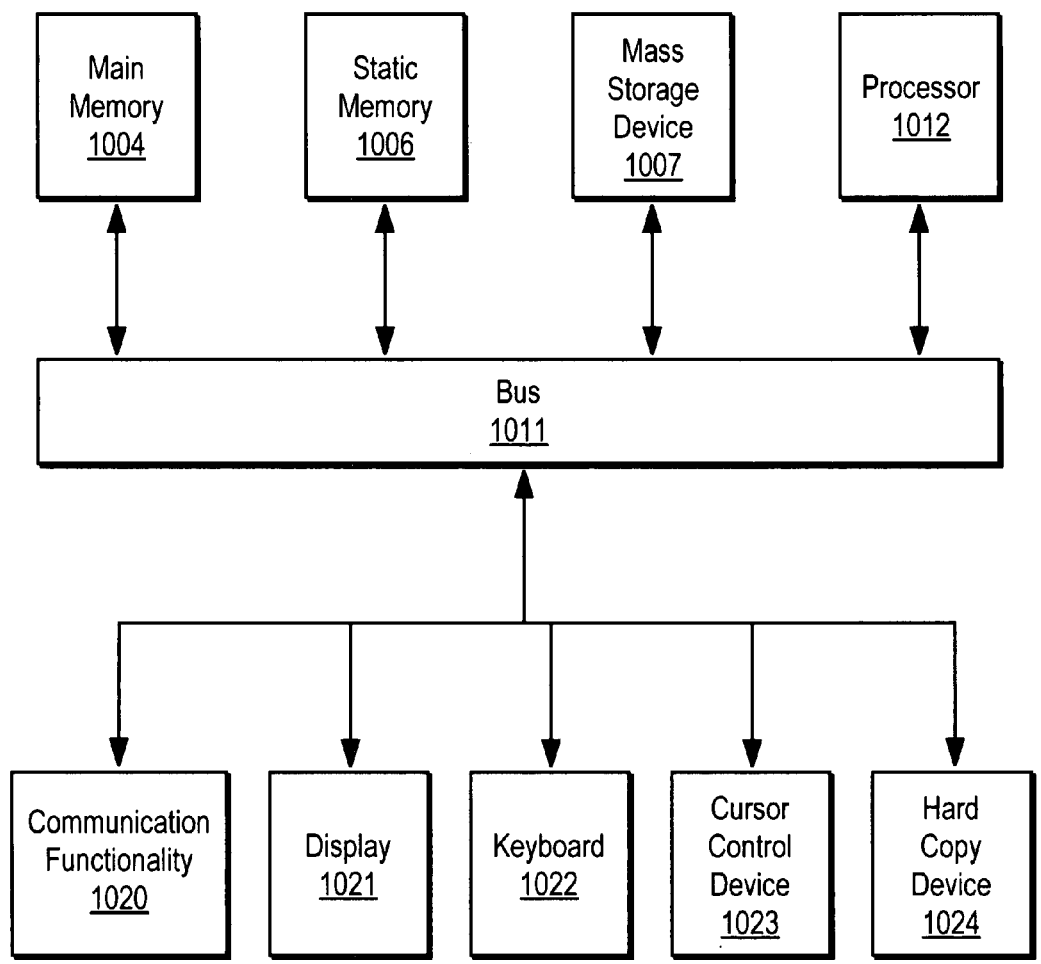
FIG. 10 is a block diagram of one embodiment of a computer system.

FIG. 10 is a block diagram of an exemplary computer system that may perform one or more of the operations described herein. Referring to FIG. 10, computer system 1000 may comprise an exemplary client or server computer system. Computer system 1000 comprises a communication mechanism or bus 101011 for communicating information, and a processor 1012 coupled with bus 1011 for processing information. Processor 1012 includes a microprocessor, but is not limited to a microprocessor, such as, for example, Pentium Processor, etc.

System 1000 further comprises a random access memory (RAM), or other dynamic storage device 1004 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021 such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, trackpad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for printing instructions, data, or other information on a medium such as paper, film, or similar types of media. Furthermore, a sound recording and playback device, such as a speaker and/or microphone may optionally be coupled to bus 1011 for audio interfacing with computer system 1000. Another device that may be coupled to bus 1011 is a wired/wireless communication functionality 1025 to communication to a phone or handheld palm device.

Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

The invention claimed is:

1. A method comprising:

extracting a plurality of visual, audible, and audiovisual document elements from content contained within an input document, wherein the input document comprises a single file;

displaying at least one visual, audible, or audiovisual document elements from the extracted visual, audible, and audiovisual document elements of the input document in a graphical user interface;

automatically selecting two or more of the extracted visual, audible, or audiovisual document elements for inclusion in a multimedia thumbnail representation of the input document based on a time attribute and an information attribute associated with each of the extracted visual, audible, and audiovisual document elements to maximize a total of information content provided by the selected visual, audible, or audiovisual document elements in a given amount of time, wherein the automatically selecting comprises calculating a time attribute and an information attribute for each of the extracted visual, audible, and audiovisual document elements and selecting one or more visual, audible, or audiovisual document elements based on each time attribute and each information attribute, wherein each time attribute is calculated, using one or more characteristics of a device that is to display the multimedia representation, to determine a minimum presentation time for a user to comprehend each of the extracted visual, audible, and audiovisual document elements, and wherein each information attribute is calculated, using one or more application constraints, to determine an amount of information content that is contained in each of the extracted visual, audible, and audiovisual document elements, and wherein automatically selecting two or more of the extracted visual, audible, or audiovisual document elements to maximize the total of information content provided by the selected visual, audible, or audiovisual document elements in the given amount of time, further comprises:

selecting audible document elements that maximize an amount of information contained in the selected audible document elements when presented in one or more time intervals of an audible channel of the multimedia representation that have not been filled with audio data associated with the selected audiovisual elements, and filling the one or more time intervals of the audible channel with the selected audible document elements; and automatically generating the multimedia representation based on the automatically selected one or more visual, audible, or audiovisual document elements.

2. The method of claim 1 wherein displaying the graphical user interface comprises:

displaying the selected document elements in a context of a page of the input document; and further comprising receiving user input from one or more user interface elements in the graphical user interface, the user input specifying at least one change in selection of the document elements for inclusion in the multimedia representation.

3. The method of claim 1 wherein displaying the document elements in the graphical user interface comprises:

displaying the document elements in a dialog box; and displaying one or more user interface elements by which a user can specify a change in selection of the document elements for inclusion in the multimedia representation.

4. The method of claim 1 further comprising:

receiving user input through the graphical user interface from a user to specify one or more operations that include at least one of the following: adding a new document element, removing an existing document element, defining a break point, grouping two or more of the document elements, and specifying a navigation path.

5. The method of claim 1 further comprising:

receiving user input through the user graphical interface to specify a presentation action associated with each of the document elements, wherein the presentation action includes at least one of the following zooming, panning over, synthesizing to speech, and synchronizing with other document elements.

6. The method of claim 1 wherein displaying a graphical user interface further comprises:

receiving user input through the graphical user interface to specify a sequence number for each document element to indicate a presentation sequence.

7. The method of claim 1 further comprising:

highlighting the document elements with different visual indicia to indicate a selection status of the document elements.

8. The method of claim 1 further comprising:

receiving user input through the graphical user interface to specify one or more parameters that constrain a visual setting or an audio setting of the multimedia representation.

9. The method of claim 8 wherein the parameters include at least one of the following: presentation duration, display resolution, synthesized voice, gender of synthesized voice, background music, target device profiling and text-to-speech engine.

10. The method of claim 1 further comprising:

storing a user profile that includes a viewing preference of a user; and utilizing the user profile in creating the multimedia presentation for the user.

11. A method comprising:

extracting a plurality of visual, audible, and audiovisual document elements from content contained within an input document, wherein the input document comprises a single file;

automatically selecting two or more visual, audible, or audiovisual document elements from the extracted visual, audible, and audiovisual document elements of the input document based on a time attribute and an information attribute associated with each of the extracted visual, audible, and audiovisual document elements to maximize a total of information content provided by the selected visual, audible, and audiovisual document elements in a given amount of time when included in a multimedia representation of the input document, wherein the automatically selecting comprises calculating a time attribute and an information attribute for each of the extracted visual, audible, and audiovisual document elements and selecting at least one visual, audible, or audiovisual document element based on each time attribute and each information attribute, wherein each time attribute is calculated, using one or more characteristics of a device that is to display the multimedia representation, to determine a minimum presentation time for a user to comprehend each of the extracted visual, audible, and audiovisual document elements, and wherein each information attribute is calculated, using one or more application constraints, to determine an amount of information content that is contained in each of the extracted visual, audible, and audiovisual document elements, and wherein automatically selecting two or more of the extracted visual, audible, or audiovisual document elements to maximize the total of information content provided by the selected visual, audible, or audiovisual document elements in the given amount of time, further comprises:
- selecting audible document elements that maximize an amount of information contained in the selected audible document elements when presented in one or more time intervals of an audible channel of the multimedia representation that have not been filled with audio data associated with the selected audiovisual elements, and
- filling the one or more time intervals of the audible channel with the selected audible document elements; and
- automatically generating the multimedia representation based on the automatically selected one or more visual, audible, or audiovisual document elements; and
- displaying an interactive user interface to playback a combination of the multimedia representation and the input document under user control.

12. The method of claim 11 further comprising:
- linking at least one of the document elements to a region on a page of the input document; and
- under the user control, switching between presentation of the multimedia representation and the input document by utilizing the linking.

13. The method of claim 11 further comprising:
- providing a manual navigation control for a user to view the input document.

14. The method of claim 11 further comprising:
- providing an automatic navigation control for a user to view the multimedia representation.

15. The method of claim 11 wherein providing an interactive user interface further comprises:
- embedding a play indicator in at least a page of the input document; and
- activating the play indicator to play back the multimedia representation from a corresponding document element linked to the page.

16. The method of claim 11 wherein providing an interactive user interface further comprises:
- playing back the multimedia representation of a portion of a document page when the portion of the document page is selected in a document viewing interface; and
- automatically resizing the selected portion of the page in the multimedia representation.

17. The method defined in claim 11 further comprising adding a voice annotation to the multimedia representation.

18. The method defined in claim 11 further comprising adding a tag to the multimedia representation.

19. The method defined in claim 11 wherein displaying the multimedia representation in response to a user activating a user control on a document viewer interface for viewing the input document.

20. An apparatus comprising:
- a memory to store an input document; and
- a processor coupled with the memory to execute a multimedia thumbnail generator to extract a plurality of visual, audible, and audiovisual document elements from content contained within the input document and automatically generate a multimedia representation from one or more visual, audible, or audiovisual document elements automatically selected from extracted document elements from the input document based on one or more optimizing constraints to maximize a total of information content that is provided by the selected document element in a given amount of time, wherein the one or more optimizing constraints comprises one or more characteristics of a device and one or more application constraints, wherein the automatic selection comprises calculating a time attribute and an information attribute for each of the extracted visual, audible, and audiovisual document elements and selecting one or more visual, audible, or audiovisual document elements based on each time attribute and each information attribute, wherein each time attribute is calculated, using one or more characteristics of a device that is to display the multimedia representation, to determine a minimum presentation time for a user to comprehend each of the extracted visual, audible, and audiovisual document elements, wherein each information attribute is calculated, using the one or more application constraints, to determine an amount of information content that is contained in each of the extracted visual, audible, and audiovisual document elements, and wherein the automatic selection of two or more of the extracted visual, audible, or audiovisual document elements to maximize the total of information content provided by the selected visual, audible, or audiovisual document elements in the given amount of time, further comprises the processor configured to:
  - select audible document elements that maximize an amount of information contained in the selected audible document elements when presented in one or more time intervals of an audible channel of the multimedia representation that have not been filled with audio data associated with the selected audiovisual elements, and
  - fill the one or more time intervals of the audible channel with the selected audible document elements, and
- a graphical user interface, coupled to the multimedia thumbnail generator, to present the automatically selected visual, audible, and audiovisual document elements and to receive a user input to edit the multimedia representation.

21. The apparatus of claim 20, wherein the graphical user interface includes:
- a document page display view to display the document elements of the multimedia representation in a context of a page of the input document and to receive the user input.

22. The apparatus of claim 20, wherein the graphical user interface includes:
- one or more dialog boxes to display the document elements of the multimedia representation and to receive the user input.

23. The apparatus of claim 20, wherein the graphical user interface uses different visual indicia to indicate a different selection status of each document element.

24. The apparatus of claim 20, wherein the graphical user interface provides a menu of presentation actions associated with each document element for a user to select one of the presentation actions for the associated document element.

25. The apparatus of claim 20, wherein the graphical user interface provides a printing interface for a user to specify one or more parameters that constrain printing of the multimedia representation to a target.

26. The apparatus of claim 25, wherein the printing interface includes one or more of the following:
a content selection section, an audio setting section, and an imported content section.

27. An apparatus comprising:
a memory to store an input document; and
a processor coupled with the memory to execute a
a multimedia thumbnail generator to analyze the input document and extract a plurality of visual, audible, and audiovisual document elements from the input document and automatically generate a multimedia representation from one or more visual, audible, or audiovisual document elements automatically selected from extracted document elements from the input document based on one or more optimizing constraints and a user input, wherein the one or more optimizing constraints are utilized to maximize a total of information content provided by the selected document elements in a given amount of time, and comprise one or more characteristics of a device displaying a graphical user interface and one or more application constraints, wherein the automatic selection comprises calculating a time attribute and an information attribute for each of the extracted visual, audible, and audiovisual document elements and selecting one or more visual, audible, or audiovisual document elements based on each time attribute and each information attribute, wherein each time attribute is calculated, using one or more characteristics of a device that is to display the multimedia representation, to determine a minimum presentation time for a user to comprehend each of the extracted visual, audible, and audiovisual document elements, and wherein each information attribute is calculated, using the one or more application constraints, to determine an amount of information content that is contained in each of the extracted visual, audible, and audiovisual document elements, and wherein the automatic selection of two or more of the extracted visual, audible, or audiovisual document elements to maximize the total of information content provided by the selected visual, audible, or audiovisual document elements in the given amount of time, further comprises the processor configured to:
  select audible document elements that maximize an amount of information contained in the selected audible document elements when presented in one or more time intervals of an audible channel of the multimedia representation that have not been filled with audio data associated with the selected audiovisual elements, and
  fill the one or more time intervals of the audible channel with the selected audible document elements, and
a graphical user interface, coupled to the multimedia thumbnail generator, to present the multimedia representation and to switch between the presentation of the multimedia representation and presentation of the input document under user control.

28. The apparatus of claim 27 further comprising:
a document viewing interface for a user to view the input document using manual control.

29. The apparatus of claim 27 further comprising:
an automatic viewing interface to automatically resize and navigate the multimedia representation.

30. The apparatus of claim 27 further comprising:
a stop indicator associated with at least one of the document elements to allow a user to stop the presentation of the multimedia representation and to switch to the presentation of the input document.

31. The apparatus of claim 27 further comprising:
at least one of the following indicators: play indicator, pause indicator, fast forward indicator, fast backward indicator, skipping indicator embedded in at least a page of the input document to allow a user to control the multimedia representation from a corresponding document element linked to the page.

32. A non-transitory computer readable storage medium with instructions thereon which, when executed by a system, cause the system to perform a method comprising:
extracting a plurality of visual, audible, and audiovisual document elements from content within an input document, wherein the input document comprises a single file; automatically selecting two or more visual, audible, or audiovisual document elements from the extracted visual, audible, and audiovisual document elements of the input document for inclusion into a multimedia representation of the input document based on one or more optimizing constraints to maximize a total of information content provided by the selected two or more visual, audible, or audiovisual document elements in a given amount of time, wherein the one or more optimizing constraints comprises one or more characteristics of a device displaying a graphical user interface and one or more application constraints, wherein the automatically selecting comprises calculating a time attribute and an information attribute for each of the extracted visual, audible, and audiovisual document elements and selecting one or more visual, audible, or audiovisual document elements based on each time attribute and each information attribute, wherein each time attribute is calculated, using the one or more characteristics of the device that is to display the multimedia representation, to determine a minimum presentation time for a user to comprehend each of the extracted visual, audible, and audiovisual document elements, and wherein each information attribute is calculated, using the one or more application constraints, to determine an amount of information content that is contained in each of the extracted visual, audible, and audiovisual document elements, and wherein automatically selecting two or more of the extracted visual, audible, or audiovisual document elements to maximize the total of information content provided by the selected visual, audible, or audiovisual document elements in the given amount of time, further comprises:
  selecting audible document elements that maximize an amount of information contained in the selected audible document elements when presented in one or more time intervals of an audible channel of the multimedia representation that have not been filled with audio data associated with the selected audiovisual elements, and
  filling the one or more time intervals of the audible channel with the selected audible document elements;
automatically generating the multimedia representation based on the automatically selected one or more visual, audible, and audiovisual document elements;
providing a graphical user interface to view the automatically selected visual, audible, and audiovisual document elements and to edit the multimedia representation.

33. The non-transitory computer readable storage medium of claim 32 wherein providing a user interface further comprises:

providing the graphical user interface for a user to specify one or more parameters that constrain a visual setting or an audio setting of the multimedia representation.

34. A non-transitory computer readable storage medium with instructions thereon which, when executed by a system, cause the system to perform a method comprising:

extracting a plurality of visual, audible, and audiovisual document elements from content contained within an input document, wherein the input document comprises a single file;

automatically selecting two or more visual, audible, or audiovisual document elements from the extracted visual, audible, and audiovisual document elements of the input document for inclusion into a multimedia representation of the input document based on one or more optimizing constraints to maximize a total of information content provided by the selected two or more visual, audible, or audiovisual document elements in a given amount of time, wherein the one or more optimizing constraints comprise one or more characteristics of a device displaying a graphical user interface and one or more application constraints, wherein the automatic selection comprises calculating a time attribute and an information attribute for each of the extracted visual, audible, and audiovisual document elements and selecting one or more visual, audible, or audiovisual document elements based on each time attribute and each information attribute, wherein each time attribute is calculated, using the one or more characteristics of the device that is to display the multimedia representation, to determine a minimum presentation time for a user to comprehend each of the extracted visual, audible, and audiovisual document elements, and wherein each information attribute is calculated, using the one or more application constraints, to determine an amount of information content that is contained in each of the extracted visual, audible, and audiovisual document elements, and wherein automatically selecting two or more of the extracted visual, audible, or audiovisual document elements to maximize the total of information content provided by the selected visual, audible, or audiovisual document elements in the given amount of time, further comprises:

selecting audible document elements that maximize an amount of information contained in the selected audible document elements when presented in one or more time intervals of an audible channel of the multimedia representation that have not been filled with audio data associated with the selected audiovisual elements, and filling the one or more time intervals of the audible channel with the selected audible document elements;

automatically generating the multimedia representation based on the automatically selected one or more visual, audible, or audiovisual document elements;

providing an interactive user interface to playback a combination of the multimedia representation and the input document under user control.

35. The non-transitory computer readable storage medium of claim 34 wherein providing an interactive user interface further comprises:

embedding a play indicator in at least a page of the input document; and activating the play indicator to play back the multimedia representation from a corresponding document element linked to the page.

36. The non-transitory computer readable storage medium of claim 34 wherein providing an interactive user interface further comprises:

playing back the multimedia representation of a portion of a document page when the portion of the document page is selected in a document viewing interface; and automatically resizing the selected portion of the page in the multimedia representation.

37. The method of claim 1, wherein the automatically selecting two or more of the extracted visual, audible, or audiovisual document elements to maximize the total of information content provided by the selected visual, audible, or audiovisual document elements in a given amount of time, further comprises:

selecting visual and audiovisual document elements that maximize an amount of information contained in the combination of selected visual and audiovisual document elements when presented in a video channel of the multimedia representation in the given amount of time;

filling the video channel of the multimedia representation with the selected visual and audiovisual document elements in an order in which the selected visual and audiovisual document elements occur in the input document, wherein audio data associated with the selected audiovisual elements are utilized to fill an audio channel of the multimedia representation and are synchronized with a presentation of the corresponding audiovisual document elements in the multimedia representation;

automatically generating the multimedia representation from the filled video channel and audible channel for the multimedia representation.

\* \* \* \* \*